United States Patent
Brown et al.

(10) Patent No.: US 12,464,006 B2
(45) Date of Patent: Nov. 4, 2025

(54) SYSTEM AND METHOD FOR GRAPHICAL RETICULATED ATTACK VECTORS FOR INTERNET OF THINGS AGGREGATE SECURITY (GRAVITAS)

(71) Applicant: The Trustees of Princeton University, Princeton, NJ (US)

(72) Inventors: Jacob Brown, Toronto (CA); Tanujay Saha, Princeton, NJ (US); Niraj K. Jha, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 253 days.

(21) Appl. No.: 18/027,765

(22) PCT Filed: Sep. 20, 2021

(86) PCT No.: PCT/US2021/051022
§ 371 (c)(1),
(2) Date: Mar. 22, 2023

(87) PCT Pub. No.: WO2022/066551
PCT Pub. Date: Mar. 31, 2022

(65) Prior Publication Data
US 2023/0328094 A1 Oct. 12, 2023

Related U.S. Application Data

(60) Provisional application No. 63/081,390, filed on Sep. 22, 2020.

(51) Int. Cl.
*H04L 9/40* (2022.01)

(52) U.S. Cl.
CPC ...... *H04L 63/1433* (2013.01); *H04L 63/1416* (2013.01); *H04L 63/1425* (2013.01); *H04L 63/1441* (2013.01)

(58) Field of Classification Search
CPC ............. H04L 63/1433; H04L 63/1416; H04L 63/1425; H04L 63/1441; G06F 21/552; G06N 5/02
See application file for complete search history.

(56) References Cited

U.S. PATENT DOCUMENTS 11,296,937 B2 *  4/2022  Nolan ................... H04L 63/123
2007/0143824 A1   6/2007  Shahbazi
(Continued)

FOREIGN PATENT DOCUMENTS

WO      2020219157 A1   10/2020

OTHER PUBLICATIONS

International Search Report and Written Opinion for corresponding PCT Application No. PCT/US2020/051022, dated Dec. 27, 2021.
(Continued)

*Primary Examiner* — SM A Rahman
(74) *Attorney, Agent, or Firm* — Goldberg & Liao, LLP

(57) ABSTRACT

According to various embodiments, a system for detecting security vulnerabilities in at least one of cyber-physical systems (CPSs) and Internet of Things (IoT) devices is disclosed. The system includes one or more processors configured to construct an attack directed acyclic graph (DAG) unique to each CPS or IoT device of the devices. The processors are further configured to generate an aggregate attack DAG from a classification of each device and a location of each device in network topology specified by a system administrator. The processors are also configured to calculate a vulnerability score and exploit risk score for each node in the aggregate attack DAG. The processors are further configured to optimize placement of defenses to reduce an adversary score of the aggregate attack DAG.

39 Claims, 25 Drawing Sheets

(56) References Cited

U.S. PATENT DOCUMENTS

| | | | |
|---|---|---|---|
| 2007/0214497 | A1 | 9/2007 | Montgomery et al. |
| 2016/0077897 | A1* | 3/2016 | Tsang ..................... G06F 9/541 |
| | | | 719/328 |
| 2017/0046519 | A1 | 2/2017 | Cam |
| 2018/0191751 | A1* | 7/2018 | El-Moussa .......... G06F 16/9024 |
| 2022/0150268 | A1* | 5/2022 | Herwono ............. G06F 21/552 |

OTHER PUBLICATIONS

Zhang et al., "Aggregating vulnerability metrics in enterprise networks using attack graphs", Journal of Computer Security, Jul. 2021.

Saha, Tanujay et al., "SHARKS: Smart Hacks, Attacks, RisKs, and Security in Internet of Things based on Machine Learning", IEEE Transactions on Emerging Topics in Computing, vol. 10, pp. 870-885, Jan. 13, 2021.

First Inc., Common vulnerability scoring system version 3.1 specification document, 2019, available online: https://www.first.org/cvss/v3.1/specification-document.

Ur-Rehman, A. et al., "Vulnerability modelling for hybrid IT systems," 2019 IEEE International Conference on Industrial Technology (ICIT), pp. 1186-1191, Feb. 1, 2019.

Aksu, M. Ugar et al., "A Quantitative CVSS-Based Cyber Security Risk Assessment Methodology For IT Systems," 2017 International Carnahan Conference on Security Technology (ICCST), pp. 1-8, 2017.

Ou, Xinming and Singhal, Anoop, "Quantitative Security Risk Assessment of Enterprise Networks," Springer, 2012.

Noel, S. et al., "Measuring security risk of networks using attack graphs", International Journal of Next-Generation Computing, vol. 1, No. 1, pp. 135-147, Jul. 2010.

Malowidzki, Marek et al., "TAG: Topological attack graph analysis tool," 2019 3rd Cyber Security in Networking Conference (CSNet), pp. 158-160, 2019.

Mosenia, Arsalan and Jha, Niraj K., "A comprehensive study of security of Internet-of-Things," IEEE Transactions on Emerging Topics in Computing, vol. 5, No. 4, pp. 586-602, 2017.

Bosche, Ann et al., "Unlocking Opportunities in the Internet of Things", Bain & Company, Aug. 7, 2018, available online: https://www.bain.com/insights/unlocking-opportunities-in-the-internet-of-things/.

Akmandor, Ayten Ozge and Jha, Niraj K., "Smart health care: An edge-side computing perspective," IEEE Consumer Electronics Magazine, vol. 7, No. 1, pp. 29-37, 2018.

Stojkoska, Biljana L. Risteka and Trivodaliev, Kire V., "A review of Internet of Things for smart home: Challenges and solutions," Journal of Cleaner Production, vol. 140, pp. 1454-1464, 2017.

Zhang, Ruonan and Liu, Xinbao, "IoT-based maintenance process design for fusion reactor remote handling system," Journal of Fusion Energy, vol. 33, No. 6, pp. 653-657, 2014.

Yun, Miao and Yuxin, Bu, "Research on the architecture and key technology of Internet of Things (IoT) applied on smart grid," Proceedings from the IEEE International Conference on Advances in Energy Engineering, pp. 69-72, 2010.

Al-Ali, A.R. and Aburukba, Raafat, "Role of Internet of Things in the smart grid technology", Journal of Computer and Communications, vol. 3, No. 5, pp. 229-233, Jan. 1, 2015.

Datta, Soumya Kanti et al., "Integrating Connected Vehicles in Internet of Things Ecosystems: Challenges and Solutions", IEEE 17th International Symposium on A World of Wireless, Mobile and Multimedia Networks (WoWMoM), pp. 1-6, Jun. 21, 2016.

Thierer, Adam and Castillo, Andrea, "Projecting the growth and economic impact of the Internet of Things", Mercatus Center, George Mason University, Arlington, VA, Economic Perspectives, 2015, available online: https://www.mercatus.org/system/files/IoT-EP-v3.pdf.

Stavridis, James and Weinstein, Dave, "The Internet of Things Is a Cyberwar Nightmare", Foreign Policy, Nov. 3, 2016, available online: https://foreignpolicy.com/2016/11/03/the-internet-of-things-is-a-cyber-war-nightmare/.

Lewis, James Andrew, "Managing Risk for the Internet of Things", Center for Strategic and International Studies, Feb. 17, 2016, available online: https://csis-website-prod.s3.amazonaws.com/s3fs-public/legacy_files/files/publication/160217_Lewis_ManagingRiskIoT_Web_Redated.pdf.

Markey, Edward J. and Blumenthal, Richard, Letter to acting administrator James Owen concerning cybersecurity issues with internet-connected cars, United States Senate, available online: https://www.markey.senate.gov/imo/media/doc/NHTSA%20Cybersecurity%20Followup.pdf, Jun. 11, 2020.

Margolis, J. et al., "An in-depth analysis of the Mirai botnet," in Proceedings of the International Conference on Software Security and Assurance, pp. 6-12, 2017.

Saha, Tanujay and Sehwag, Vikash, "TV-PUF: a fast lightweight analog physical unclonable function," 2016 IEEE International Symposium on Nanoelectronic and Information Systems (iNIS), pp. 182-186, Dec. 1, 2016.

Mckay, Kerry A. et al., "Report on Lightweight Cryptography", National Institute of Standards and Technology, U.S. Department of Commerce, Mar. 2017.

Nia, Arsalan Mohsen et al., "Physiological information leakage: A new frontier in health information security," IEEE Transactions on Emerging Topics in Computing, vol. 4, No. 3, pp. 321-334, 2016.

Matrosov, Aleksandr et al., "Stuxnet under the microscope," ESET LLC, available online: https://www.esetnod32.ru/company/viruslab/analytics/doc/Stuxnet_Under_the_Microscope.pdf.

Juels, Ari et al., "The blocker tag: Selective blocking of RFID tags for consumer privacy," Proceedings of the ACM Conference on Computer and Communications Security, pp. 103-111, Jan. 1, 2003.

Huang, Ling et al., "Adversarial Machine Learning," Proceedings of 4th ACM Workshop on Artificial Intelligence and Security, pp. 43-58, Oct. 21, 2011.

IBM Security, "Penetration testing: Protect critical assets using an attacker's mindset," IBM Corporation, 2019, available online: https://www.ibm.com/downloads/cas/MY6L2O89.

Ou, Xinming et al., "MulVAL: A logic-based network security analyzer", USENIX Security Symposium, vol. 8, pp. 113-128, Jul. 31, 2005.

Jajodia, Sushil and Noel, Steven, "Topological vulnerability analysis", Cyber Situational Awareness, pp. 139-154, 2010.

Al Ghazo, Alaa T. et al., "A2G2V: Automatic attack graph generation and visualization and its applications to computer and SCADA networks," IEEE Transactions on Systems, Man, and Cybernetics: Systems, pp. 1-11, 2019.

Barrére, Martin and Lupu, Emil C., "Naggen: a Network Attack Graph GENeration Tool", 2017 IEEE Conference on Communications and Network Security (CNS), pp. 378-379, Oct. 1, 2017.

Kordy, Barbara et al., "DAG-Based Attack and Defense Modeling: Don't Miss the Forest for the Attack Trees," Computer Science Review, vol. 13-14, pp. 1-38, Mar. 29, 2013.

Hahm, Oliver et al., "Operating Systems for Low-End Devices in the Internet of Things: a Survey," IEEE Internet of Things Journal, vol. 3, No. 5, p. 1, Dec. 4, 2015.

Dulaunoy, A. et al., CVE-search project, CVE-Search, available online: http://cve-search.org.

OpenVAS—Open Vulnerability Assessment Scanner, Greenbone Networks GmbH, available online: https://www.openvas.org/.

Hernandez, Grant et al., "A smart Nest thermostat: A spy in your home," Black Hat USA, 2014, available online: https://www.blackhat.com/docs/us-14/materials/us-14-Jin-Smart-Nest-Thermostat-A-Smart-Spy-In-Your-Home-WP.pdf.

* cited by examiner

Exploit Discovery Model Comparison

| Model | 1 | 2 | 3 | 4 | 5 | 6 | 7 | 8 | 9 | 10 |
|---|---|---|---|---|---|---|---|---|---|---|
| GRAVITAS | ✓ | ✓ | ✓ | ✓ | ✓ | ✓ | ✓ | ✓ | ✓ | ✓ |
| MulVAL | ✗ | ✓ | ✗ | ✓ | ✗ | ✗ | ✓ | ✗ | ✗ | ✗ |
| TVA | ✓ | ✗ | ✗ | ✓ | ✗ | ✗ | ✓ | ✗ | ✓ | ✗ |
| TAG | ✗ | ✓ | ✗ | ✓ | ✗ | ✓ | ✓ | ✓ | ✓ | ✗ |
| A2G2V | ✗ | ✓ | ✗ | ✗ | ✗ | ✗ | ✓ | ✗ | ✗ | ✓ |
| VSA | ✓ | ✗ | ✓ | ✗ | ✗ | ✓ | ✓ | ✗ | ✓ | ✓ |
| Tenable | ✗ | ✗ | ✓ | ✓ | ✓ | ✓ | ✓ | ✓ | ✓ | ✗ |
| NetSPA | ✗ | ✓ | ✗ | ✓ | ✗ | ✗ | ✓ | ✗ | ✗ | ✗ |

*FIG. 1*

CVSS Scoring Values

| Category | Factor | Type | Score |
|---|---|---|---|
| Exploitability | Attack Vector | Network | 0.85 |
| | | Adjacent | 0.62 |
| | | Local | 0.60* |
| | | Physical | 0.44* |
| | Attack Complexity | Low | 0.77 |
| | | Medium | 0.44* |
| | | High | 0.20* |
| | Scope | Changed | N.A. |
| | | Unchanged | N.A. |
| | Privileges Required | None | 0.85 |
| | | Low; Scope Changed | 0.68 |
| | | Low; Scope Unchanged | 0.62 |
| | | High; Scope Changed | 0.50 |
| | | High; Scope Unchanged | 0.27 |
| | User Interaction | None | 0.85 |
| | | Required | 0.62 |
| | Accessibility | High | 0.80† |
| | | Medium | 0.60† |
| | | Low | 0.40† |
| | | None | 0† |
| Impact | Confidentiality Integrity Availability | High | 0.56 |
| | | Low | 0.20 |
| | | None | 0 |
| Defense | Node & Edge Defense | None | 1† |
| | | Workaround | 0.90† |
| | | Temporary | 0.60† |
| | | Definite | 0.30† |
| | | Infallible | 0 |

*FIG. 3*

The Exploit Goals in the Master Attack Graph Template J

| Exploit Goal | Example |
|---|---|
| Eavesdropping over network | Unencrypted communication channel allows adversary to glean information |
| Denial-of-Service (DoS) | Mirai botnet used to flood DNS servers with bogus traffic |
| Disabling device | Adversary remotely turns off a smart city drone mid-operation, causing it to crash |
| Actuator malfunction | IoT-enabled pacemaker told to increase pace of electric shocks, causing serious harm to the patient |
| Data leak | Adversary accesses memory of a smart lock, learning the times of day when the victim is not at home |
| Data change | Adversary gains control of a traffic sensor and provides fake data to an ML algorithm that suggests routes for autonomous vehicles |
| Replay attack | Communications protocol does not use a digitally signed timestamp, allowing the adversary to resend previous commands |
| Ransomware attack | Adversary gains root access to device and encrypts essential files, asking the user to present payment in exchange for the key |
| Obtain authentication key to device $i$ with permissions $j$ | Adversary finds password on a mobile device that permits him to login to a local controller from a different device |
| Obtain open access to device $i$ with permissions $j$ | Adversary finds password on a mobile device that permits him to login to a local controller directly from the mobile device |

FIG. 6

Device Subcategories for Template Construction

| Factor | Subcategory | Description | Examples |
|---|---|---|---|
| 1 | Non-Updatable | Device's application-level software and firmware cannot be changed | Devices with application software as immutable firmware, devices without a CPU (including some ASICs), devices without transistors or memory |
| | Updatable | Device's application-level software or firmware can be changed | Any device that runs a version of Linux or most versions of RIoT, PSoC, and FPGA-like devices |
| 2 | Local Network Access | Device is only connected to a local network (no direct Internet access) | Fitbit Versa 2 (still considered local network access only if Internet-based data are accessed via a non-router proxy device) |
| | External Network Access | Device is connected to the Internet (this can be through an adjacent router) | Apple Watch Series 5 Cellular Model |
| 3 | Send | Device is physically capable of broadcasting a signal in a format readable to other devices | A sensor with an output port containing a pin that can vary its voltage |
| | Receive | Device is physically capable of receiving and "understanding" a signal from another device | An actuator with a simple electronic circuit that depends on the input voltage level |
| | Send and Receive | Device can both send and receive information | 4G-enabled smartphone, drone with camera |

*FIG. 9*

Administrator-specified Device Properties

| Device Property | Description |
|---|---|
| Name | Unique name of device |
| Category | Choose from the categories in Fig. 8 |
| Subcategory | Choose from the subcategories in Fig. 9 |
| Device set | Devices in the same set are treated as identical; during system optimization, all devices in a single set are given the same defense concurrently |
| Confidentiality scores | A list of CVSS confidentiality scores for the exploit goals of this device |
| Integrity scores | A list of CVSS integrity scores for the exploit goals of this device |
| Availability scores | A list of CVSS availability scores for the exploit goals of this device |
| Accessibility scores | A list of accessibility scores for the entry nodes of this device |
| Login permissions | A list of devices that possess credentials to login to this device; a single device may have multiple permission types, and multiple devices may login to this device using the same permission type |
| Execute command permissions | A list of devices that possess credentials to send valid commands to this device; a single device may have multiple permission types, and multiple devices may login to this device using the same permission type |
| General permissions | Some simple devices, such as embedded IoT sensors, do not possess a formal security protocol, and can be controlled by any device that connects to them |
| Local networked devices | A list of devices in this device's local network; if this is a "hub" network centered around a device like a WiFi router, the algorithm will automatically connect all devices in a local network group as long as each device is connected to the hub |

*FIG. 11*

Defense Properties

| Device Property | Description |
|---|---|
| Defense name | Unique name for the defense; all defenses in a device set that share the same name will be applied simultaneously if chosen during optimization |
| Device name | A list of devices to which this defense can be applied |
| Cost | The cost of defense in relative units |
| Node score list | A list containing each node and updated *node defense score* affected by the defense |
| Edge score list | A list containing each edge and updated *edge defense score* affected by the defense |

*FIG. 12*

**Selected Defenses in *M* (with Default Settings)**

| Defense | Type | Vulnerability(-ies) | Cost |
|---|---|---|---|
| Multifactor authentication | Single node | No mutual authentication | 2 |
| Salt, hash, and encrypt passwords | Single node | Encryption key read from memory in unencrypted form | 1 |
| Limit installation of unverified software | Single node | Download unwhitelisted malware | 1 |
| Limit physical access to device ports | Multi node | Sensor tampering, side-channel analysis | 3 |
| Establish difficult-to-crack device passwords | Edge | Access requested, no strong authentication | 2 |

*FIG. 13*

Permission Subgraph Node Types

| Attack Node | Login Permission | Execute Command Permission |
|---|---|---|
| Access network address; production/business address | Yes | No |
| Access ports of network | Yes | No |
| Reconfigure system specifications | Yes | Yes |
| Access database/system files | Yes | Yes |
| SQL query with format -F | Yes | Yes |
| Rewrite code for updates | Yes | Yes |
| Remove/modify files on disk | Yes | Yes |
| Download unwhitelisted malware | Yes | Yes |
| Read state variable at address A | Yes | Yes |
| Write state variable at address A | Yes | Yes |
| Execute command | No | Yes |

*FIG. 14*

Vulnerability Score Calculation

$ISS = 1 - [(1 - confidentiality)(1 - integrity)(1 - availability)(1 - accessibility)]$;
if *scope* is *unchanged* then
 | $Impact = 6.42 \times ISS$;
else
 | $Impact = 7.52 \times (ISS - 0.029) - 3.25 \times (ISS - 0.02)^{15}$;
end
 $Exploitability = 8.22 \times attack\_Vector \times attack\_Complexity \times privileges\_Required \times user\_Interaction$;
if $Impact < 0$ then
 | $Impact = 0$;
end
if *scope* is *unchanged* then
 | $x = min\,[(Impact + Exploitability), 10]$;
else
 | $x = min[1.08 \times (Impact + Exploitability), 10]$;
end
$vulnerabilty\_Score = \frac{x}{10} \times defense\_Score$

*FIG. 15*

| Exploit Risk Calculation |
| --- |
| Function *calculate_Exploit_Score* (*n*, *G*):<br>    Data: Node *n*; Attack graph *G*<br>    Result: Exploit risk score for *n*<br>    // $c_i$ is a child of note *n*<br>      *union_Probability* = *n.vulnerability_Score* x<br>      $(1 - \Pi_{i=1}^{k} (1 - (c_i \times \text{\textit{edge\_Defense}}(n, c_i))))$;<br>      *exploit_Score* = $-7^{-union\_Probability} + 1$;<br>    /\*Activation function \*/<br>    if *exploit_Score* > 1 then<br>      \| *exploit_Score* = 1;<br>    end<br>    if *exploit_Score* < 0 then<br>      \| *exploit_Score* = 0;<br>    end<br>    return *exploit_Score*; |

*FIG. 16*

Propagating Exploit Risk Scores

Data: Attack graph $G$ with nodes $n_1, ..., n_k \in N$;
entry nodes $A \subset N$; exploit goal nodes $L \subset N$
Result: Attack graph $G$ with exploit risk scores at each
$n_1$ $average\_Sum = |A|$;

while $\frac{average\_Sum}{|A|} > sum\_Ratio$ and $count < max\_Cycle$ do
    $average\_Sum = 0$;
    Queue $Q \leftarrow L$;
    while $|Q| > 0$ do
      $n \leftarrow Q$.dequeue;
      if $n$ has not been visited then
        $n.exploit\_Score =$ calculate_Exploit_Score$(n, G)$;
        if $n \in A$ then
          $average\_Sum = average\_Sum +$
          $|n.exploit\_Score - n.exp\_Avg|$;
        end
        $n.exp\_Avg = exp\_Weight \times n.exploit\_Score +$
        $(1 - exp\_Weight) \times n.exp\_Avg$;
        Mark $n$ as visited;
        for $parent\_Node$ in $n.parents$ do
          if $parent\_Node$ has not been visited then
            $Q$.append($parent\_Node$);
          end
        end
      end
    end
    $count += 1$;
end

*FIG. 17*

Optimizing the System

Data: Attack graph $G$; defenses $d_1, ..., d_j \subset M$
Result: $H, h\_Best$; /* $h\_Best$ includes the
    optimally-defended graph $G$ and optimal defense set $\widetilde{M} \subset M$ */
$S =$ refresh_Defense_Set($\emptyset, G$); /* $S$ is a set
    containing graphs that each differ in only one defense */
$H = \emptyset$;
repeat
    $chosen\_Min\_Obj\_Val = \infty$;
    for $s$ in $S$ do
        $local\_Obj\_Value =$ local_Objective_Func($\alpha\_Local$,
          $s.d.cost$, adversary_Score($s.G$));
        if $local\_Obj\_Value < chosen\_Min\_Obj\_Val$ then
        |   $chose\_Set = s$;
        end
        $s.time\_In\_Set = s.time\_In\_Set + 1$;
    end
    $total\_Cost = total\_Cost + chosen\_Set.d.cost$;
    $H$.add(make_History_Moment($chosen\_Set.d$,
      $chosen\_Set.G$));
    $S$.remove($chosen\_Set$);
    $S =$ refresh_Defense_Set($chosen\_Set.d, chosen\_Set.G$);
until $|S| \leq 0$ and $|H| \geq max\_Defenses$ and
 global_Objective_Func($\alpha\_Global$, total_Cost($h.\widetilde{M}$),
 adversary_Score($h.G$)) $\leq$ opt_Halt_Value;
$min\_Global\_Obj\_Val = \infty$;
for $h \in H$ do
    $global\_Obj\_Val =$ global_Objective_Func($\alpha\_Global$,
      total_Cost($h.\widetilde{M}$), adversary_Score($h.G$));
    if $global\_Obj\_Val < min\_Global\_Obj\_Val$ then
    |   $min\_Global\_Obj\_Val = global\_Obj\_Val$;
    |   $h\_Best = h$
    end
end

*FIG. 18*

Refreshing the Defense Set

Function refresh_Defense_Set (*d,G*):
    Data: Defense *d* just selected by objective function,
           graph *G* with optimal defense just added
    for *s* in *S* do
        if *s.timeInSet* > *max_Set_Time* then
           *S*.remove(*s*);
           *available_Defense_List*.add(*s.defense*)
        end
    end
    for $G \in S.graphs$ do
        *G*.apply_Defense(*chosen_Defense*);
        *G*.propagate_Defense(*chosen_Defense*);
    end
    *max_Vul_Device_Defenses* = All unused defenses
      from the device with the highest exloit risk score;
    while | *S* | < *set_Size* and | *available_Defense_List* |
      > 0 do
        if | *max_Vul_Device_Defenses* | > 0 then
           *d* = random_Defense(*max_Vul_Device_Defenses*);
        else
           *d* = random_Defense(*available_Defense_List*);
        end
        *new_G* = deep_Copy(*G*);
        *new_G*.apply_Defense(*d*);
        *new_G*.propagate_Defense(*d*); /* Similar to
          Section 5.3.2, except that the first
          nodes in the queue are the nodes upon
          which the new defense is placed */
        *S*. add(*d, new_G*);
        *available_Defense_List*.remove(*d*);
    end
    return *S*;

*FIG. 19*

Administrator-specified Parameters for Controlling the Score Propagation and Optimization Process

| Parameter | Purpose | Description | Suggested Values |
|---|---|---|---|
| sum_Ratio | Limits number of propagation cycles in Fig. 17 to reduce computation time | Sets a floor on the average of the difference between every entry node's most recent exploit score and a weighted average of its exploit scores from previous propagation cycles. This difference should approach zero as the exploit scores converge. | $10^{-4}$ to $10^{-6}$ |
| exp_Weight | Helps measure progress towards the convergence of entry node exploit scores | This is the parameter for determining the exponentially-weighted moving average of a node's exploit risk score over all propagation cycles. We compare this average to the newest score to gauge convergence. | 0.05 to 0.2 |
| max_Cycle | Limits number of propagation cycles in Fig. 17 to reduce computation time | Sets a ceiling on the number of propagation cycles | 50 to 250 |
| max_Defenses | Limits number of optimization rounds | The maximum number of defenses that can be added during optimization | $|N| \times [0.05 \text{ to } 0.2]$ |
| opt_Halt_Value | Limits number of optimization rounds | Sets a floor for the global objective value, below which optimization ceases | Preference-dependent |
| α_Global | The weighting for the global objective function | The weighting of *total_Cost* against *adversary_Score* increases linearly with α_Global | Preference-dependent |
| α_Local | The weighting for the local objective function | The weighting of *defense_Cost* against the marginal difference in *adversary_Score* increases linearly with α_Local | 0 to 0.0001 |
| max_Set_Time | Improve optimization performance by removing low-performing defenses | The maximum amount of rounds that a defense may remain in the defense set | 10 to 50 |
| set_Size | Reduce computation time by comparing less defenses in every optimization round | The number of defenses in the defense set. A larger defense set will result in a better optimization result | $0.05 \times |D|$ at mimimum |

*FIG. 20*

**The Smart Home Vulnerabilities
with the Highest Exploit Risk Score**

| Device | Vulnerability | Exploit Risk Score |
|---|---|---|
| Ring Base Station | Access Requested | 0.7190 |
| Ring Front Door Motion Sensor | Sensor Tampering | 0.7040 |
| Ring Garden Motion Sensor | Sensor Tampering | 0.7035 |

*FIG. 24*

SYSTEM AND METHOD FOR GRAPHICAL RETICULATED ATTACK VECTORS FOR INTERNET OF THINGS AGGREGATE SECURITY (GRAVITAS)

CROSS-REFERENCE TO RELATED APPLICATIONS

This application claims priority to provisional application 63/081,390, filed Sep. 22, 2020, which is herein incorporated by reference in its entirety.

STATEMENT REGARDING FEDERALLY SPONSORED RESEARCH OR DEVELOPMENT

This invention was made with government support under Grant No. CNS-1617628 awarded by the National Science Foundation. The government has certain rights in the invention.

FIELD OF THE INVENTION

The present invention relates generally to securing Internet-of-Things (IoT) and/or cyber-physical system (CPS) security and, more particularly, to utilizing a graphical approach to discover and protect against undiscovered exploits and vulnerabilities in IoT/CPS systems.

BACKGROUND OF THE INVENTION

Internet-of-Things (IoT) refers to any system that includes multiple Internet-connected devices that provide transmission or computational services as one networked entity. Cyber-physical systems (CPSs) employ sensor data to monitor the physical environment and create real-world change using actuators. These broad categories include systems ranging from a single Bluetooth-enabled smartwatch to a smart city containing millions of devices. Many of these devices employ rudimentary operating systems and are energy-constrained, often lacking basic security features. IoT/CPS may also include a diverse set of devices and complex network topologies, presenting a large attack surface that provides multiple enticing opportunities for a cunning adversary. The unique IoT/CPS exploits require that organizations employ rigorous threat analysis and risk mitigation techniques to minimize the likelihood of a successful attack.

Organizations are projected to have spent $742 billion USD on IoT devices in 2020 alone—an amount which is expected to increase by 11.3% annually through 2024. Over the next few years, it is expected that IoT/CPS move beyond small-scale applications and become significantly more commonplace in healthcare, manufacturing, transportation, law enforcement, and energy distribution. The development of 5G communication infrastructure, autonomous vehicles, and hardware specifically configured for machine learning (ML) is also accelerating the adoption of large-scale IoT/CPS.

However, many industry experts and leading political figures argue that the widespread adoption of IoT systems has the potential to engender "catastrophic" consequences. One ominous sign is the Mirai botnet attack of 2016, a distributed denial-of-service (DDoS) attack that briefly brought down large parts of the Internet on the U.S. East Coast. This attack was particularly notable because a single security flaw, unchanged default passwords, resulted in significant technological and economic disruption. This catastrophic outcome highlights how a single malicious adversary can potentially compromise an entire IoT/CPS, if not the whole Internet.

Cyber attacks like the Mirai botnet should serve as a warning: every IoT/CPS must be scrutinized for exploit pathways before deployment. The large attack surface of autonomous vehicle networks, smart cities, and other publicly accessible IoT/CPS should draw scrutiny because a security breach of at least one connected device during the lifetime of the system is extremely likely, potentially allowing the adversary to wreak havoc on other parts of the system. It is not uncommon for multiple devices in an IoT system to have various vulnerabilities. An attacker can utilize these vulnerabilities to launch multi-stage attacks. In multi-stage attacks, a compromised device can be used as a stepping stone to attack other devices in the network. To prevent future Mirai-like attacks, engineers will need to consider not just the security of individual devices, but of the whole system.

Moreover, securing IoT/CPS is challenging because of the limited resources available to their constituent devices. Such limitations often preclude the devices from employing intrusion detection mechanisms and executing complex cryptographic protocols. Although IoT-friendly lightweight protocols exist, it is still challenging to select a suitable combination of defenses to obtain optimal performance and security of the system. The high cost of adding defenses to large IoT/CPS is a frequent obstacle in deploying security features, making it critical for organizations to maximize risk reduction given a limited security budget.

As such, there is a need for an approach to secure an IoT/CPS system while considering the resource constraints, performance, and security of individual devices of that system.

SUMMARY OF THE INVENTION

According to various embodiments, a system for detecting security vulnerabilities in at least one of cyber-physical systems (CPSs) and Internet of Things (IoT) devices is disclosed. The system includes one or more processors configured to construct an attack directed acyclic graph (DAG) unique to each CPS or IoT device of the devices. The processors are further configured to generate an aggregate attack DAG from a classification of each device and a location of each device in network topology specified by a system administrator. The processors are also configured to calculate a vulnerability score and exploit risk score for each node in the aggregate attack DAG. The processors are further configured to optimize placement of defenses to reduce an adversary score of the aggregate attack DAG.

According to various embodiments, a method for detecting security vulnerabilities in at least one of cyber-physical systems (CPSs) and Internet of Things (IoT) devices is disclosed. The method includes constructing an attack directed acyclic graph (DAG) unique to each CPS or IoT device of the devices. The method further includes generating an aggregate attack DAG from a classification of each device and a location of each device in network topology specified by a system administrator. The method also includes calculating a vulnerability score and exploit risk score for each node in the aggregate attack DAG. The method further includes optimizing placement of defenses to reduce an adversary score of the aggregate attack DAG.

According to various embodiments, a non-transitory computer-readable medium having stored thereon a computer program for execution by a processor configured to perform a method for detecting security vulnerabilities in at least one of cyber-physical systems (CPSs) and Internet of Things (IoT) devices is disclosed. The method includes constructing an attack directed acyclic graph (DAG) unique to each CPS or IoT device of the devices. The method further includes generating an aggregate attack DAG from a classification of each device and a location of each device in network topology specified by a system administrator. The method also includes calculating a vulnerability score and exploit risk score for each node in the aggregate attack DAG. The method further includes optimizing placement of defenses to reduce an adversary score of the aggregate attack DAG.

Each attack DAG includes a first plurality of nodes, where each node of the first plurality represents a system-level operation of the device. Each attack DAG further includes a plurality of paths, where each path represents an attack vector of the device. Each attack DAG also includes a second plurality of nodes, where each node of the second plurality represents an exploit goal of the device.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 1 depicts a table of exploit discovery model comparison according to an embodiment of the present invention;

FIG. 3 depicts a table of GRAVITAS-specific CVSS score values according to an embodiment of the present invention;

FIG. 6 depicts a table of exploit goals in a master attack graph template according to an embodiment of the present invention;

FIG. 9 depicts a table of device subcategories for template construction according to an embodiment of the present invention;

FIG. 11 depicts a table of administrator specific device properties according to an embodiment of the present invention;

FIG. 12 depicts a table of defense properties according to an embodiment of the present invention;

FIG. 13 depicts a table of selected defenses in the set of defenses according to an embodiment of the present invention;

FIG. 14 depicts a table of permission subgraph node types according to an embodiment of the present invention;

FIG. 15 depicts an algorithm for vulnerability score calculation according to an embodiment of the present invention;

FIG. 16 depicts an algorithm for exploit risk calculation according to an embodiment of the present invention;

FIG. 17 depicts an algorithm for propagating exploit risk scores according to an embodiment of the present invention;

FIG. 18 depicts an algorithm for optimizing the system according to an embodiment of the present invention;

FIG. 19 depicts an algorithm for refreshing the defense set according to an embodiment of the present invention;

FIG. 20 depicts a table of administrator-specified parameters for controlling score propagation and optimization process according to an embodiment of the present invention;

FIG. 24 depicts a table of smart home vulnerabilities with the highest exploit risk score according to an embodiment of the present invention.

DETAILED DESCRIPTION OF THE INVENTION

Figure 2:
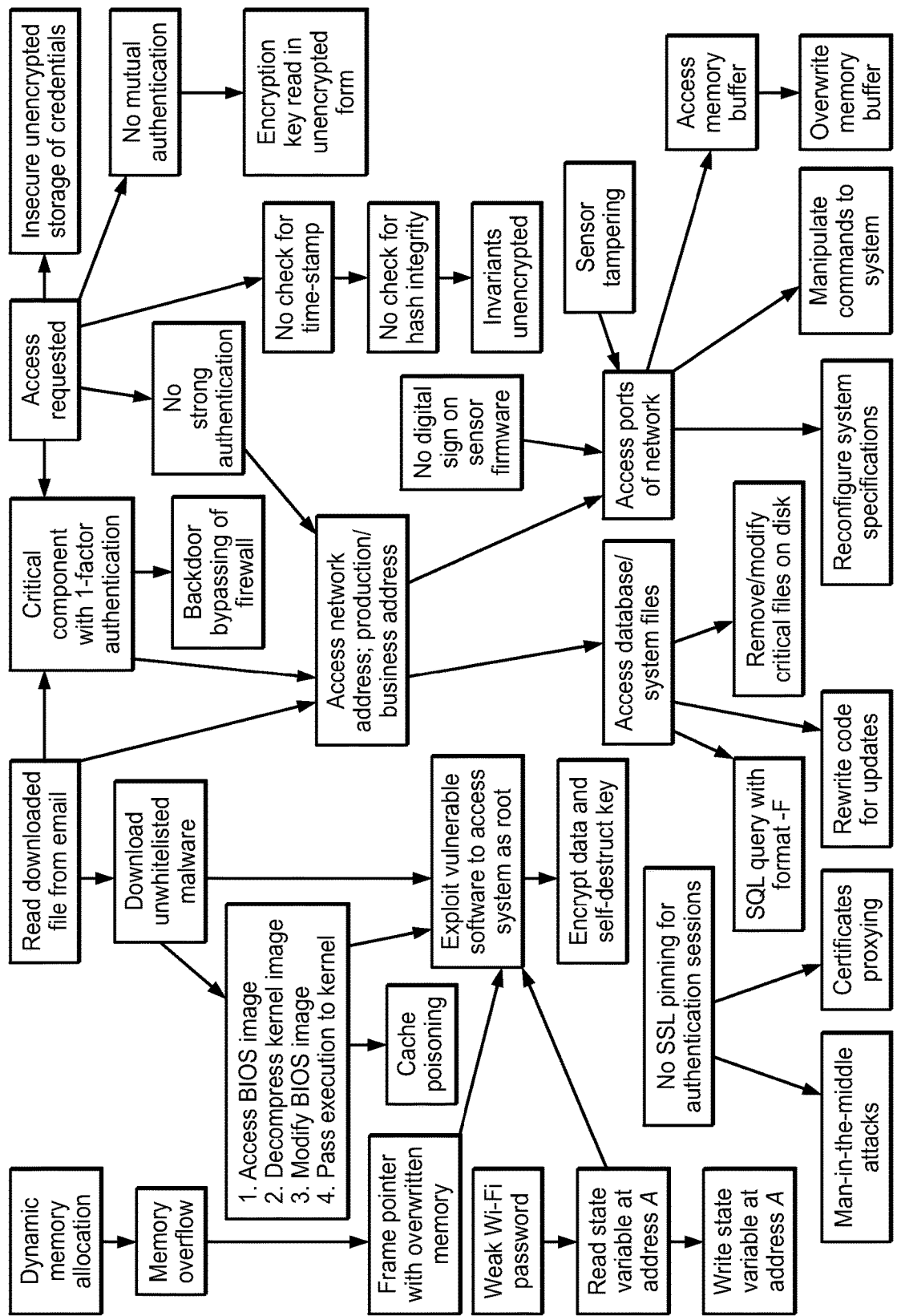
FIG. 2 depicts a SHARKS attack graph according to an embodiment of the present invention.

Internet-of-Things (IoT) and cyber-physical systems (CPSs) may include thousands of devices connected in a complex network topology. The diversity and complexity of these components present an enormous attack surface, allowing an adversary to exploit security vulnerabilities of different devices to execute a potent attack. Though significant efforts have been made to improve the security of individual devices in these systems, little attention has been paid to security at the aggregate level. As such, generally disclosed herein are embodiments for a comprehensive risk management system, referred to herein as GRAVITAS, for IoT/CPS that can identify undiscovered attack vectors and optimize the placement of defenses within the system for optimal performance and cost. While existing risk management systems consider only known attacks, embodiments of the disclosed model employ a graphical approach to extrapolate undiscovered exploits, enabling identification of attacks overlooked by manual penetration testing (pen-testing). The model is flexible enough to analyze practically any IoT/CPS and provide the system administrator with a concrete list of suggested defenses that can reduce system vulnerability at optimal cost. GRAVITAS can be employed by governments, companies, and system administrators to configure secure IoT/CPS at scale, providing a quantitative measure of security and efficiency in a world where IoT/CPS devices will soon be ubiquitous.

GRAVITAS combines the hardware, software, and network stack vulnerabilities of a system into a single attack graph. This attack graph, which includes undiscovered vulnerabilities and the connections between them, contains attack vectors that are passed over by risk management tools that employ only known vulnerabilities. These attack vectors are then assigned risk scores according to a probabilistic method that models the interaction between attack impacts and the graph's vulnerabilities. Using these quantitative scores as a foundation for measuring risk, GRAVITAS suggests defenses to the system using an optimization process that lowers the risk score at minimum cost. With an IoT/CPS configuration and threat model as input, and a list of the most cost-effective defenses as output, GRAVITAS presents a security model that allows the system administrator to discover new attack vectors and proactively configure secure IoT/CPS both pre- and post-deployment.

The novelty of the proposed methodology lies in at least the following:
(1) An automated IoT/CPS-specific exploit discovery tool that includes potential vulnerabilities and attack vectors that have yet to be discovered.
(2) A novel exploit scoring system that uses the topology of vulnerabilities in the attack graph to gauge risk at both the exploit and device levels.
(3) The ability to suggest the most effective defenses at an optimal cost via an optimization algorithm tailored to the threat model.

GRAVITAS Advantages Over Related Work

Most IoT-related security research to date has focused on remediating device-specific or application-specific security vulnerabilities. Over the last decade, researchers have discovered eavesdropping on implanted medical devices, "outage" attacks on IoT systems in nuclear power plants, tampering with smart home devices, identity theft using corrupted RFID tags, and poisoning ML models by changing sensor data, among many others. This research also occurs in the corporate world: IBM, like several other companies that offer a cloud-based IoT platform, operates a lab specifically dedicated to pen-testing of IoT systems; the company claims that its laboratory has discovered over 1000 new vulnerabilities since 2017. While databases such as the National Vulnerability Database (NVD) keep track of IoT/CPS device vulnerabilities, the sheer speed with which new devices are being deployed has made up-to-date vulnerability cataloging all but impossible.

As a result, traditional exploit discovery and risk management engines are often incapable of properly modeling exploits in IoT/CPS networks. While some models have attempted to correct this problem by adapting the vulnerability scoring system or automatically generating access conditions, none consider the unique (and often undiscovered) vulnerabilities of public-facing IoT/CPS devices or the convoluted exploits available to a clever adversary. Even "premium" commercial risk management applications such as Tenable only examine risk from the perspective of individual vulnerabilities, rather than the chain of vulnerabilities through multiple devices that often constitute exploits in IoT/CPS. While some open-source risk management systems like MulVAL can theoretically find vulnerability chains in large systems, they do not model the undocumented (yet surprisingly common) vulnerabilities present in IoT/CPS and the topology-specific connections between them.

GRAVITAS is also unique among IoT/CPS exploit discovery software in allowing the user to minimize the impact of a successful exploit and automatically optimize the placement of defenses to reduce risk at a minimum cost. Commercial software like Tenable claims to do risk optimization, but only does this at the vulnerability level and does not consider exploit chains between multiple devices. Other tools, such as TAG and VSA, claim to have optimization abilities, but disclose very little detail in their respective articles. The information that does exist suggests that the available defenses for both these systems are few in number and extremely generic, bearing little resemblance to the transparent and mathematically rigorous optimization algorithm applied by GRAVITAS. The table in FIG. 1 compares the features of GRAVITAS to similar exploit discovery and risk management software.

The various columns in Table 1 are described below:
(1) Includes vulnerabilities due to physical manipulation, as well as the hardware and software stacks.
(2) Discovers novel attack vectors.
(3) Calculates exploit risk based on experimentally validated algorithm.
(4) Models different privileges within devices and their ability to access other devices.
(5) Incorporates novel attack vectors that have not yet been exploited in real-world systems.
(6) Optimizes defense placement to reduce exploit risk at minimum cost.
(7) Can find "the weakest link" (most vulnerable part of the system).
(8) Accurately handles cyclic network topology.
(9) Allows easy customization based on a system administrator's risk impact assessment and chosen adversary model.
(10) Configured specifically for the unique characteristics of IoT/CPS networks.

The SHARKS Framework

GRAVITAS improves upon the work of SHARKS (Smart Hacking Approaches for Risk Scanning in Internet-of-Things and Cyber-Physical Systems based on Machine Learning), which provided a novel framework for discovering IoT/CPS exploits. Instead of artificially separating a system into different layers, SHARKS eschews a rigid classification and models an exploit chain (attack vector) as it appears to an adversary: a series of steps that begins at an "entry point" (a root node) and ends at a "goal" (a leaf node). The SHARKS attack graph, shown in FIG. 2 was created by deconstructing 41 known attacks on IoT/CPS into a series of steps represented by a vulnerability node chain (an exploit), and subsequently merging every node chain into a single directed acyclic graph (DAG). This graph makes no distinctions between network-level, hardware-level, or software-level nodes: what matters is the procedure that brings attackers to their desired destination.

SHARKS assigns descriptive features to each node in the attack graph, using one-hot encoding for categorical features as well as using continuous features such as the node's mean height in the graph. A target feature is assigned to each pair of nodes indicating whether the two were connected by an edge (an ordered sequence of two steps in an attack). This dataset is then used to train a Support Vector Machine (SVM) model, which discovered 122 novel exploits. SHARKS is described in more detail in PCT Publication No. WO 2020/219157, which is herein incorporated by reference in its entirety.

Attack Graphs

Both SHARKS and GRAVITAS are based on attack graphs, albeit with differences in their node types. Each graph (G) is described using the following terminology:

N: The set of nodes in the graph. Each node represents a single vulnerability in the system, such as "sensor tampering" or "no SSL pinning," as nonlimiting examples.

E: The set of edges in the graph. Edges represent exploits, or pathways between vulnerabilities. Unlike in other attack graph models, edges do not have an access control parameter; each edge instead represents a possible path between vulnerabilities. Different permissions are instead represented by different nodes.

D: The set of nodes and edges corresponding to one device. Every device is depicted by a subgraph of the complete attack graph (D c G).

A: The nodes at which an adversary can access the system. These "entry nodes" are the starting points for any attack. They are also vulnerabilities (A c N).

L: The leaf nodes of the graph. These represent the completion of an attack (L c N). These "exploit goals" represent the end goal of an adversary's attack, such as "Disable device" or "DoS attack," as nonlimiting examples.

P: The set of nodes that constitute a complete attack vector. Each exploit begins at an entry node and concludes at an exploit goal node. More formally, an exploit P is any ordered set of nodes in the form $\{a, n_1, \ldots, n_k, l\}$ where $a \in A$, $n_i \in N$, $l \in L$. The same entry node and exploit goal pair can be a part of multiple attack vectors.

M: The set of all defenses that can be applied to the attack graph.

$\acute{M}$: The subset of defenses chosen by the optimization process.

Common Vulnerability Scoring System (CVSS)

CVSS is an experimentally validated scoring system for device vulnerabilities that is widely used in risk management systems. Here, every node in the attack graph is assigned a vulnerability score, which represents the intrinsic risk of the vulnerability to the system. This score incorporates both the impact of a vulnerability and its ease of exploitation and is calculated using an algorithm almost identical to that used in CVSS to score vulnerabilities. This algorithm uses the scoring factors described in the table in FIG. 3.

There are three principal categories of factors: exploitability, impact, and defense. Exploitability refers to the effort required by an adversary to "succeed" in an attack step, while impact refers to the damage that a successful attack can inflict on the security of the system. Defense refers to the extent to which the attack is prevented from being exploited. The scores in the exploitability category are determined by the composition of the attack graph and are computed algorithmically, while those for impact are decided by the system administrator based on their judgement of an attack's impact. The defense scores are hard coded to a particular defense, though these can be modified by the user. In the table in FIG. 3, the scores marked with a * are taken from a study that adapts some of the original CVSS scores to better reflect the ease of exploitation of real-world IoT/CPS devices. The scores marked with a t are newly added scores that have been experimentally validated, to be described in greater detail below.

Threat Model

The threat model here includes an adversary who wishes to achieve an exploit goal l with a motivation specified by its impact score. The adversary reaches the desired l by starting at an entry node a and passing through other vulnerability nodes $n_i \in N$. This complete path P is known as an exploit chain or attack and may involve vulnerabilities in multiple devices. While the system administrator can assign a unique impact score to each l or randomly assign the scores via a specified distribution, it is not known in advance which exact exploit goal an adversary may attempt to access. Hence, the administrator must consider all possible exploits in the attack graph to minimize risk over the entire system.

For simplicity, it is assumed that the motivation of the adversary to inflict damage is congruent to the system administrator's assessment of the damage that the attack would cause to system security. It is also assumed that the adversary also has access to GRAVITAS and may decide to perform an exploit based on information provided by the model. As a result, the system administrator has an incentive to ensure that high impact exploits are not easily accessible to the adversary. This may require adding additional defenses to the system via the model's optimization component.

Motivation

While SHARKS can find novel exploits on specific types of IoT/CPS, it is too generic to adequately model the multitude of intricate exploits in a real-world system. GRAVITAS solves this issue by creating a unique attack DAG for every device in an IoT/CPS and adding additional pathways between devices based on network topology. The goal is not to find specific vulnerabilities in each device (a process that often requires static and dynamic analysis of the system) but to understand the impact that an exploit would have on the security of the entire system if a certain vulnerability were to exist. Moreover, unlike other IoT/CPS security models, GRAVITAS can account for potential exploits that have not yet been discovered, enabling a proactive and comprehensive approach to network security that existing risk management tools cannot provide. GRAVITAS can also suggest defenses that reduce system vulnerability at the lowest cost, employing a "defense-in-depth" optimization approach that is intractable to human analysis. By giving an administrator the ability to visualize and mitigate IoT/CPS exploits before the system is deployed, GRAVITAS hopes to prevent the next Mirai-like attack before it happens.

System Overview

Figure 4:
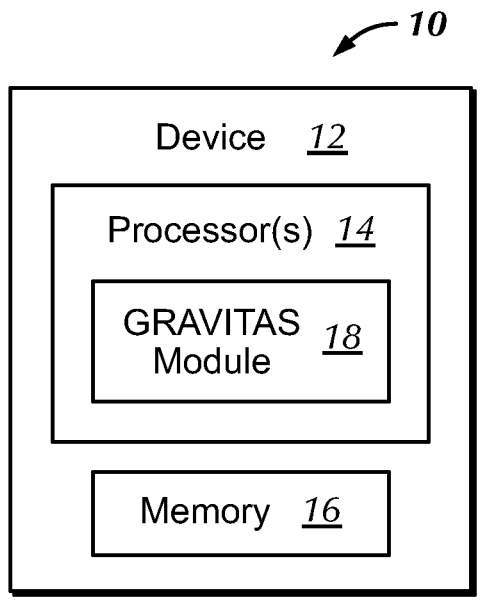
FIG. 4 depicts a block diagram of a system for implementing GRAVITAS according to an embodiment of the present invention.

FIG. 4 illustrates a system 10 configured to implement the GRAVITAS framework.

The system 10 includes a device 12, which may be implemented in a variety of configurations including general computing devices such as but not limited to desktop computers, laptop computers, tablets, network appliances, and the like. The device 12 may also be implemented as a mobile device such as but not limited to a mobile phone, smart phone, smart watch, or tablet computer. The device 12 can also include but is not limited to IoT sensors. The device 12 includes one or more processors 14 such as but not limited to a central processing unit (CPU), a graphics processing unit (GPU), or a field programmable gate array (FPGA) for performing specific functions and memory 16 for storing those functions. The processor 14 includes a GRAVITAS module 18 for detecting vulnerabilities. The GRAVITAS module 18 methodology will be described in greater detail below.

GRAVITAS Methodology

Figure 5:
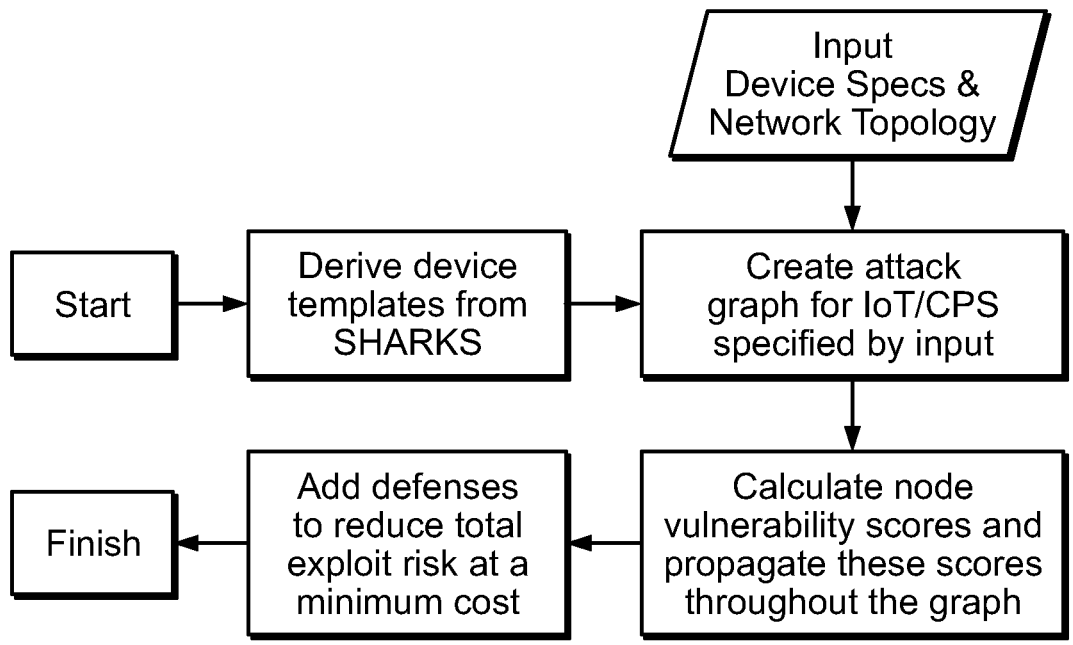
FIG. 5 depicts a flow chart of overall structure of GRAVITAS according to an embodiment of the present invention.

As shown in FIG. 5, GRAVITAS methodology 100 includes four primary components: deriving the device templates from SHARKS at step 102; creating an attack graph from the devices and network topology specified by the system administrator at step 104; calculating the vulnerability score and exploit risk score for every node in the graph at step 106; and optimizing the placement of defenses to reduce the total exploit risk of the system at step 108.

Deriving Device Templates 102:

All device attack graphs used in GRAVITAS are derived in part from an updated version of the SHARKS graph. This master attack graph template (J) includes a subset of the original SHARKS graph, including ML-predicted edges between nodes that indicate new vulnerabilities. Each of these templates contains all known and predicted vulnerabilities and attack vectors for a given device. By including predicted exploits rather than just publicly known exploits in the system attack graph, GRAVITAS allows the system to be protected against possible novel exploits.

Figure 7:
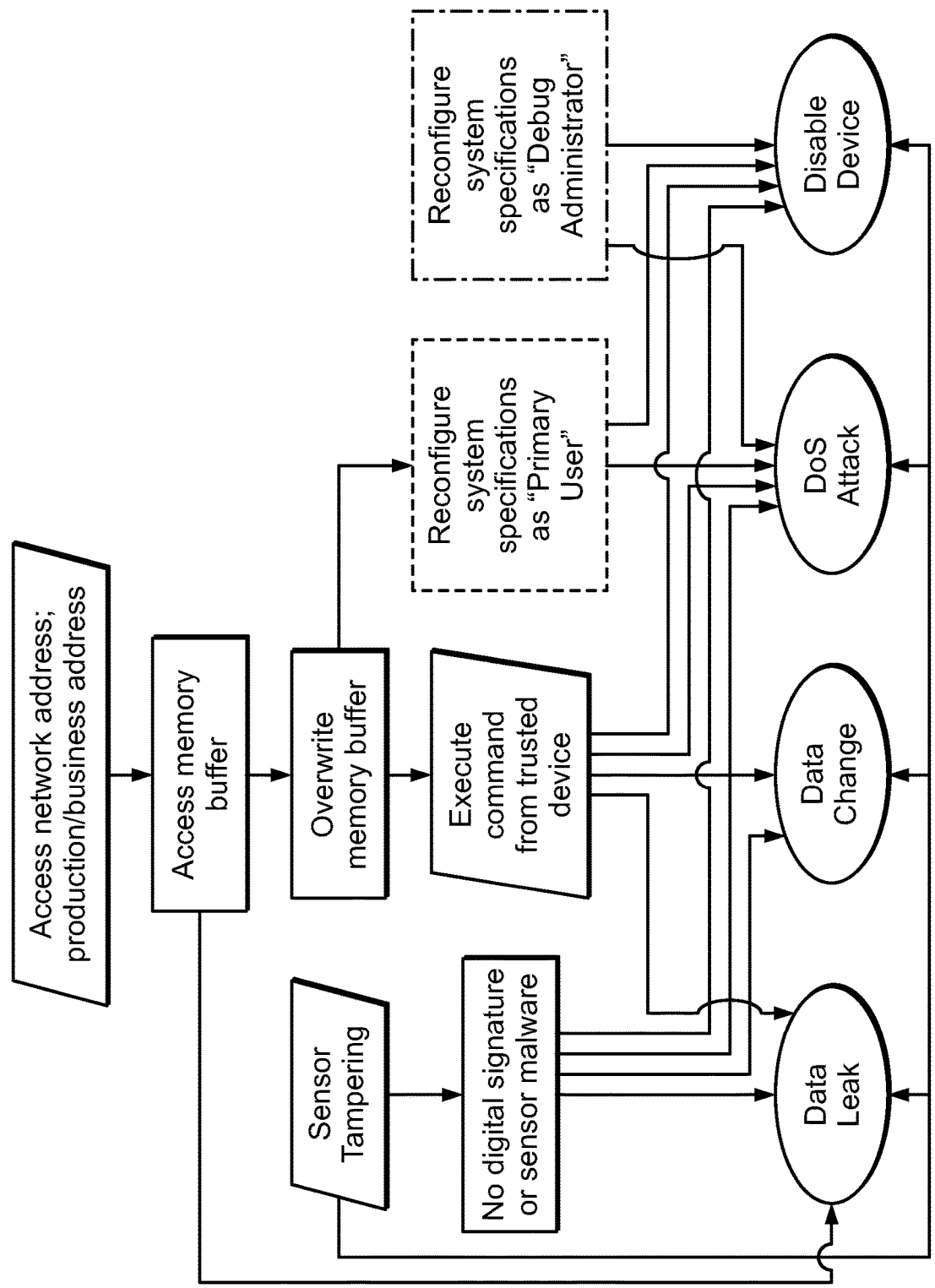
FIG. 7 depicts a Nest Garden Sensor in a smart home system as derived from a template for a Sensor (non-updatable, send and receive, local network access) where ovals represent exploit goals and parallelograms represent entry nodes according to an embodiment of the present invention.

Every graph J also contains a new set of nodes designated as exploit goals, L. The table in FIG. 6 lists the exploit goals, which collectively represent IoT/CPS exploits. In addition, certain nodes from the original SHARKS graph are designated as entry nodes, A. Even with these additions, the master attack graph J is still a DAG, ensuring that any exploit P derived from it will be finite in length and non-repeating. GRAVITAS contains dozens of different templates for IoT/CPS devices, each of which is further customizable based on user input. FIG. 7 shows an example of a device template that has been customized to a device present in the smart home example application, to be described further below.

Creating the Device Templates: Every device template $T_i$ is a subgraph of J, the master attack graph ($T_i \subset J$). A device graph D includes the corresponding device template with modifications specified by the system administrator's input. While each device graph D derived from a template is a DAG, the complete system attack graph G may contain cycles in certain network topologies. This is acceptable because the "long" cycles created by pathways between devices still permit the exploit risk score calculation process to converge in a reasonable time frame, to be described further below.

Figure 8:
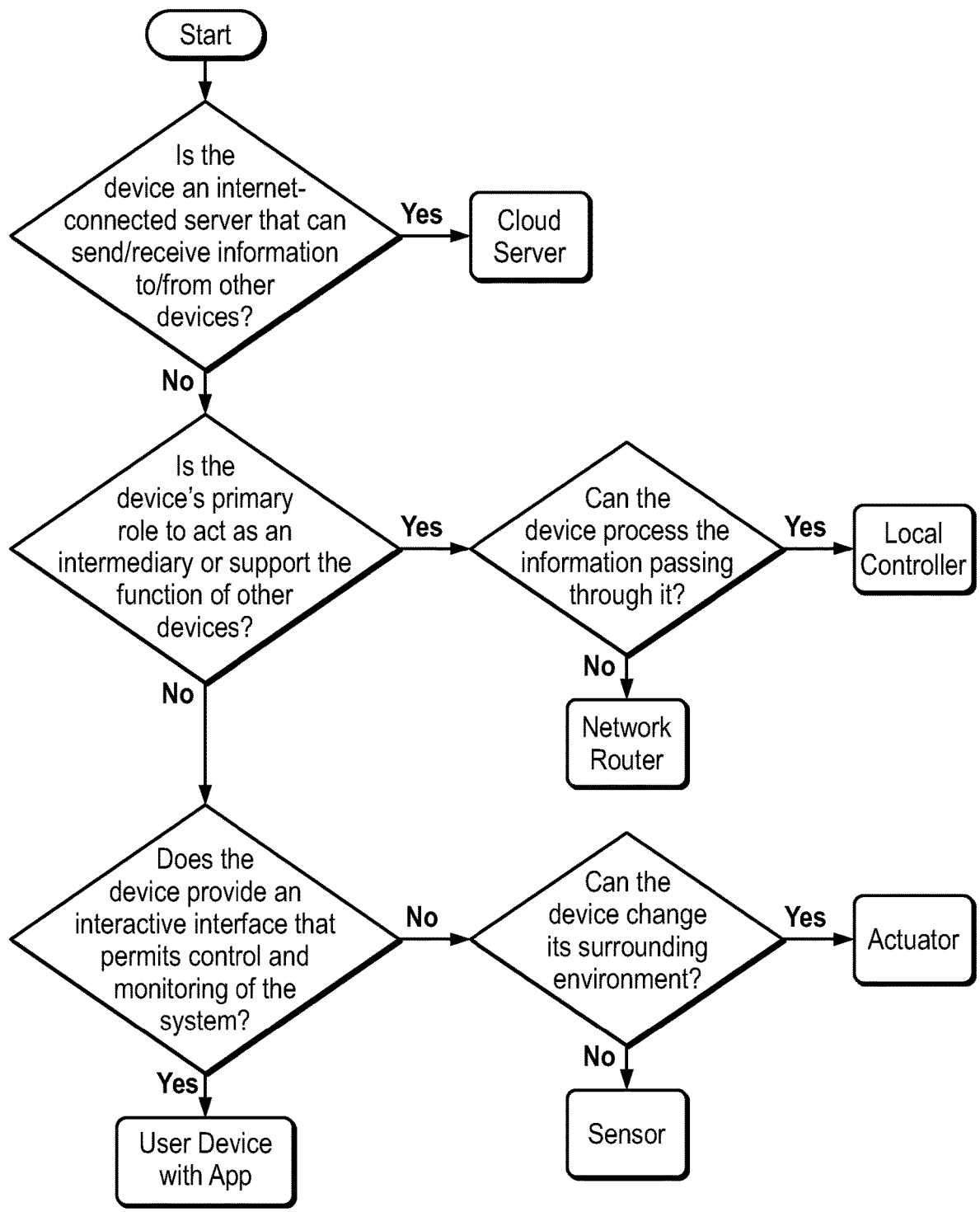
FIG. 8 depicts a flowchart for choosing correct device categories according to an embodiment of the present invention.

To create a device graph D, the device must first be classified using four factors. The first of these factors, which is referred to as a category, describes the purpose of the device; FIG. 8 shows a flowchart that helps the system administrator decide which of the six categories to select. The other three categories are referred to as subcategories, each of which describes a physical limitation of the device and consequently a hard boundary on the kind of attacks to which it is susceptible. These subcategories are described in the table in FIG. 9. The categories and subcategories together provide comprehensive coverage of numerous IoT/CPS applications such as but not limited to smart vehicles, smart buildings, health monitoring, energy management, construction management, environmental monitoring, production and assembly line management, and food supply chain.

Figure 10:
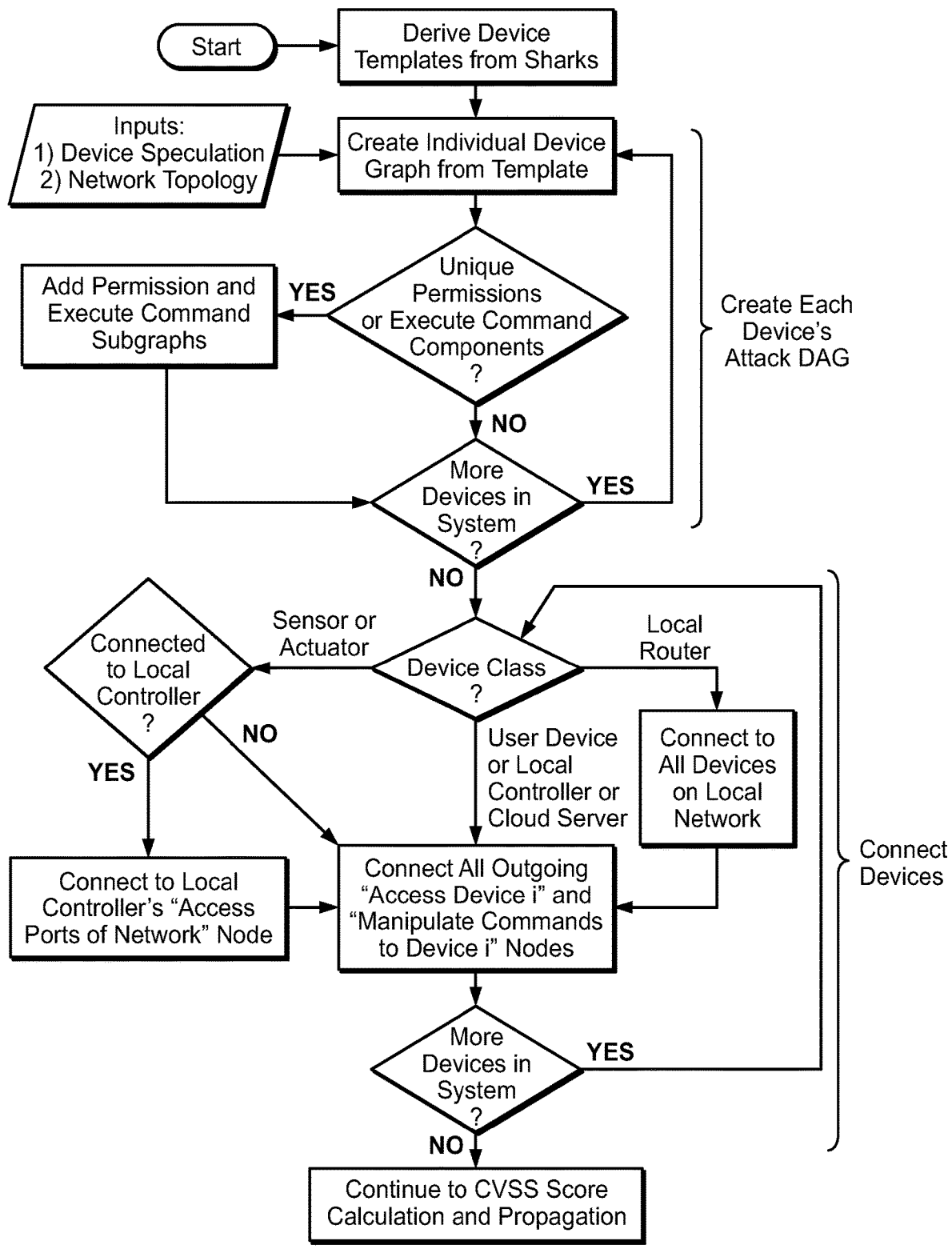
FIG. 10 depicts a flowchart for creating a complete system graph from system administrator input according to an embodiment of the present invention.

Creating IoT/CPS Configuration 104:

FIG. 10 provides an overview of how GRAVITAS creates an attack graph G from system administrator input. In addition to specifying inherent device properties, such as the device category and subcategories, the system administrator must also describe each device's location in the network topology. This includes its connections (wired and wireless) to devices in the local network as well as its ability to connect to an external network such as the Internet. The table in FIG. 11 describes a subset of these device-level characteristics. Note that most of these characteristics are entirely optional. Only "Name," "Category," and "Subcategory" are strictly necessary; all other characteristics receive default values that treat the device as a disconnected component with a low security risk. If the system administrator is unsure about the topology of a certain device or its impact scores, GRAVITAS can automatically generate the connections and impact scores from a random distribution with parameters set by the administrator. An example system configuration will be described further below.

Defenses: GRAVITAS provides M, the set of potential defenses that can be applied during optimization. The defenses list includes but is not limited to vulnerability mitigation strategies identified in NIST, OWASP, ISO, and a variety of other standard-setting organizations. The defense list includes but is not limited to: employ a hardware-based immutable root of trust; control the installation of software on operational systems; establish hard-to-crack device individual passwords; and salt, hash, and/or encrypt authentication credentials. The defenses employed by GRAVITAS correspond to a vulnerability category ("technique") that is present across devices in the same category. It will be illustrated further below how an optimized subset of these defenses can be applied to exploits in a real-world system. Note that the system administrator can add or subtract defenses to M if additional specificity or generality is required. The system administrator can also change the defense cost.

The table in FIG. 12 describes the properties of a defense in detail. Defenses can act at two places: nodes and edges. A node defense changes the score used in the node's vulnerability score calculation. An edge defense changes the weight multiplier of the corresponding edge during exploit risk score propagation. The cost of each defense and its marginal improvement to the total exploit risk (adversary score) are used in the objective function that determines which defense to add. The table in FIG. 13 shows a small selection of node (vulnerability) defenses in M.

Every device graph D initially gives each of the device's permissions blanket access to a device's capabilities, similar to administrator privileges. To limit the access of a certain permission, the system administrator can specify a defense that removes an edge between nodes in a permission subgraph. This blacklist approach simplifies the input and ensures that low-cost/high-impact defenses are added at the beginning of the optimization process.

In GRAVITAS, the cost of each defense is fixed at the outset of optimization. However, system administrators can set their own cost values based on various constraints of the system such as latency, expenditure, and energy. Because the cost and adversary score are weighted using a constant in the optimization function, the administrator can think of the cost of each defense in relative terms when deciding which values to choose. As a result, the specific numbers are not as important as the relative cost between different kinds of defenses: for example, the administrator could classify a defense's cost as either "high," "medium," or "low," each of which has a specific numerical value associated with it in a manner similar to a CVSS scoring attribute.

Permission Subgraphs: GRAVITAS allows the system administrator to specify permissions for every device. Unlike other attack graph models, the access permissions are each represented by a separate copy of a subgraph rather than as a logical statement at certain nodes or edges. This configuration makes a visualization of the attack graph easier to understand and simplifies the calculation of exploit risk scores because the same closed-form calculation can be applied to every node-edge pair.

Two different types of permissions are modeled: login permissions and execute command permissions. With a login permission, a user with the correct credentials can execute any (permitted) command on the system; this is similar to a user profile on a Linux or Windows system. With an execute command permission, a user with the correct credentials can execute a (permitted) command from a specified list. For example, this could be a set of commands recognizable in a JavaScript Object Notation (JSON) packet or the movement controls for an autonomous drone. Depending on the configuration of the IoT/CPS, different devices may have login/execute commands under the same permission name.

As described in the table in FIG. 14, certain nodes in every device template are associated with login permissions, execute command permissions, or both. These subgraphs are "repeated" for every permission type of that device. FIG. 7 shows the system-specific device graph D with nodes in different permission subgraphs delineated with different dashed box lines. Note that the system administrator can specify defenses that effectively remove certain nodes or edges, allowing the administrator to set restrictions on what each permission can access.

Connecting the Devices: Once every device's attack graph D has been produced, they can be connected into an aggregate attack graph G using the network topology specified by the system administrator. A login permission j is represented by an edge originating from the exploit goal "Obtain authentication key to device i as permission j," while an execute command permission j is represented by an edge originating from "Manipulate commands to device i with permission j." Both lead to the node "Access network address, production/business address as permission j" of device i. Both connections allow the devices to bypass the device's authentication procedures, meaning that the attacker does not have to start at the "Access requested" node where almost all non-authenticated adversaries must begin their attack. For certain sensors and actuators, "Sensor tampering" and "No digital signature on sensor firmware" are connected to the "Access ports of network" node of the neighboring local controller; this represents the local network that exists between certain local controller and sensor/actuator setups, such as those involving an Arduino. To model access to a local network, every router's "No strong authentication" node is connected in both directions to that same node in all other adjacent routers and is also connected to the "Access requested" node for adjacent devices that are not routers. External network access (i.e., to the Internet) is modeled by including nodes such as "Download unwhitelisted malware" in the device template.

Calculating and Propagating Vulnerability Scores 106:

Every node in the attack graph is first assigned a vulnerability score. These scores are then "propagated" through the graph, giving each attack node an exploit risk score. The total exploit risk of the IoT system or CPS, which herein is called the adversary score, is calculated using the adversary model chosen by the system administrator and involves a function of the exploit risk scores of entry nodes. This score is used in the objective function employed in the defense placement optimization process. The vulnerability scores are only calculated once, whereas the exploit risk scores (and adversary score) must be recalculated after adding a new defense.

All vulnerability and exploit risk scores fall into the [0,1] range. This is a departure from the traditional CVSS scoring range of [0,10], but it allows for treating each score as the probability that an adversary will attempt the attack and succeed in exploiting it. This approach allows for a probabilistic understanding of an adversary's movement through the graph.

Calculating vulnerability scores: The algorithm in FIG. 15 describes the process for calculating the vulnerability score. This algorithm includes a final line that adjusts the vulnerability score based on the defense(s) applied to the system. Each node's vulnerability score is calculated using the Exploitability factors (scope, attack_Vector, attack_Complexity, and user_Interaction) described in the table in FIG. 3. The value of each factor is dependent on the node's permission characteristics and its topographic position within the device graph D. The impact factors (confidentiality, integrity, and availability) are set by the system administrator, as is the accessibility score of each entry node. These factors are used to calculate the ISS (Impact Sub-Score). If the system administrator does not want to specify the impact score for every exploit goal, the scores can be auto generated by providing parameters for the distribution of impact scores in the specified system components. This process is similar to the one used to randomly generate IoT/CPS for testing purposes.

Propagating Exploit Risk Scores: To model IoT/CPS security, an understanding of how vulnerability scores of different nodes interact is needed. This interaction is represented by each node's exploit risk score, which is calculated using a function that involves the exploit risk scores of adjacent child nodes as shown in the algorithm in FIG. 16.

An adversary generally wants to take the least risky path possible through the attack graph; consequently, the longer and more difficult the path, the less likely the adversary is to pursue it, and the lower the exploit risk score should be. In a similar fashion, an attack graph should be more vulnerable if there are multiple paths to the same exploit goal. To represent this idea in the exploit risk score calculation in FIG. 16, a probabilistic union function is employed that gives the likelihood that an adversary will execute at least one of the exploits flowing from the current node to its children. This method is effective because it incorporates the children nodes' exploit risk scores (and the scores of their descendants, including exploit goals) into the exploit risk scores of their parents. Consequently, the exploit risk score of an entry node represents the vulnerability of all exploits reachable from that location. A description of how the parameters and functions in this algorithm were experimentally determined is further below.

If each vulnerability is thought of as a neuron, the attack graph can be thought of as a recurrent neural network (RNN), where the neuron-level score calculation combines inputs from multiple adjacent child nodes that are fed into an activation function. As with forward propagation in an RNN, the score propagation algorithm herein uses a breadth-first search that halts at nodes that have already been visited; once all nodes have been visited, the whole process is repeated, and this repetition is continued until the scores at the entry nodes have converged. The algorithm in FIG. 17 shows this process in detail.

Optimizing Defense Placement 108:

The optimization component of GRAVITAS adds defenses to the system with the goal of minimizing objective functions specified by the system administrator. It does this by creating a "history" set H that records the defense selections of successive optimization rounds. One "moment" in history h∈H refers to a single iteration of executing the local objective function; each h includes the defense that was just chosen as well as an attack graph whose scores have been updated to include the just-chosen defense and all previously added defenses. Once all h have been determined, a global objective function is used to choose the optimal defense set M̃ from among all h. The algorithm in FIG. 18 provides an overview of the optimization algorithm, whereas the algorithm in FIG. 19 describes the refresh_Defense_Set(d, G) function that is used to generate the defense set S whose hypothetical defense-graph pairings are compared by the local objective function. The table in FIG. 20 describes the parameters the administrator can set to further refine the optimization process.

Objective Functions: Choose from all defense set members s E S, where s includes a just-added defense d and corresponding graph G.

$$\min\ [\alpha\_Local \times s \cdot d \cdot cost + (1 - \alpha\_Local) \times (adversary\_Score(h_{t-1} \cdot G) - adversary\_Score(s \cdot G))] \quad (1)$$

Choose from among all moments in history h E H, where h includes defense set M and corresponding graph G with all d E M added.

$$\min\ [\alpha\_Global \times total\_Cost(h \cdot \tilde{M}) + (1 - \alpha\_Global) \times adversary\_Score(h \cdot G)] \quad (2)$$

The purpose of each objective function is to minimize the system's total exploit risk (adversary Score) while simultaneously minimizing the cost of the defenses needed to lower the vulnerability. Two separate objective functions are employed: local and global (Eq. (1) and (2), respectively). The local objective function is applied to every defense-graph pair in the current defense set; the pair that minimizes the objective function is added to the defense history. The global objective function is employed after the algorithm in FIG. 18 has completed populating the defense history; it chooses the optimal "moment" (cumulative set of defenses) from the history. Each function employs a user specified parameter a that tells the function how to weigh the adversary score against the cost. Note that in the local objective function, the marginal increase in defense cost is weighed against the corresponding marginal decrease in the graph's adversary score, while in the global objective function, the total cost is weighed against the current adversary score.

Choosing Defenses: In every optimization round, the defense that minimizes the value of the local optimization function (Eq. (1)) is chosen. The defenses that are used in this comparison are located in the Defense set 5, a list of fixed length that contains a subset of defenses that are most likely to improve the optimization function. Every defense in S is associated with a graph G that contains that same defense and all the defenses already applied to G. This list is managed via the algorithm in FIG. 19, which is invoked to refresh the defense set after every optimization round.

A defense may be removed from S for two reasons: either it has already been selected as the optimal defense in the previous optimization round, or it has been in the set for too many optimization rounds (longer than max—Set Time), which means that it probably does not contribute much to reducing the system's exploit risk. Defenses that are removed are added back to an available Defense List (initially set to M), which contains all possible defenses that the optimization function can select minus those that have already been used. When a new defense is needed in S, the algorithm randomly selects a defense from the available Defense List with a preference for defenses from the device that possesses the highest exploit risk score.

Adversary Models:

The vulnerability of a given IoT system can be expressed using a function of its entry node exploit risk scores.

$$adversary\_score = \max(A^* \subset A, |A^*| = k) \frac{\sum_{i=1}^{k} a_i \cdot exploit\_Score}{k} \quad (3)$$

This "adversary score" contains information about the ease of exploitation and impact of exploit goals in the entire graph. Given a set of entry nodes A, an adversary would likely want to enter the system at its most vulnerable location(s). As a result, the optimization process should minimize the exploit risk scores of the k highest scoring entry nodes.

Using only the highest-scoring entry node is not recommended because the adversary Score tends to "plateau" (bottom out) after only a few defenses are added. This happens because there may be no additional defenses that substantially impact the highest scoring nodes. For good performance (and to adequately protect all parts of a complex system), the system administrator should specify a k that is at least equal to the total number of devices to include exploit risk in a variety of different locations. The administrator can also adjust the vulnerability of an entry node by changing its accessibility score.

This approach assumes that the adversary has white-box knowledge about the system, and that the defenders are knowledgeable enough about an adversary's motivations to confidently assign quantitative impact scores to exploit goals. However, the adversary may not be fully knowledgeable about all the defenses that have been added to the system, and the adversary's motivations may not be fully understood. To account for this, the system administrator can instruct GRAVITAS to randomly select attack outcome impact scores drawn from a distribution. By adding additional "noise" to the model, the system administrator can ensure that their IoT/CPS is prepared to tackle a wide variety of adversaries and attacks.

Parameter Validation:

The vulnerability scoring process contains several additions and modifications from those used in other models. These include a unique "activation function" for exploit risk calculation and several scoring factors used in the vulnerability node scoring process. To validate these changes, a system called TASC (Testing for Autonomously Generated Smart Cities) was created that generates quasi-random IoT/CPS. Controllable parameters include the number of devices, the relative number of different device categories/subcategories, the distribution of connection types between different devices, defense types and costs, and impact scores for exploit goals. In theory, large systems generated with the same parameters but with a different random seed should have similar properties and broadly similar optimization curves. When optimized using the same adversary model and propagation/optimization parameters (such as a Local), these systems should trace a similar adversary score vs. defenses-added curve and should also possess a similar globally optimal solution for a given a Global.

One of the novel features of GRAVITAS involves its defense addition optimization process. Adding a defense changes the vulnerability score of the nodes and edges affected by it, which in turn influences the exploit risk scores at the entry nodes once re-propagation is completed. The adapted scoring factors in FIG. 3 were chosen by generating several broadly similar systems using different seeds and employing different scoring sets in each system's optimization procedure to identify which set resulted in the most consistent results. The activation function was chosen for the union probability function in a similar manner, comparing several different functions (including exponential, power, and logistic functions) with several different numeric values for each. By creating TASC systems with the same parameters but different random seeds, it was determined which defense score set and activation function combination was most likely to produce consistent results.

Smart Home Application Simulation

Figure 21:
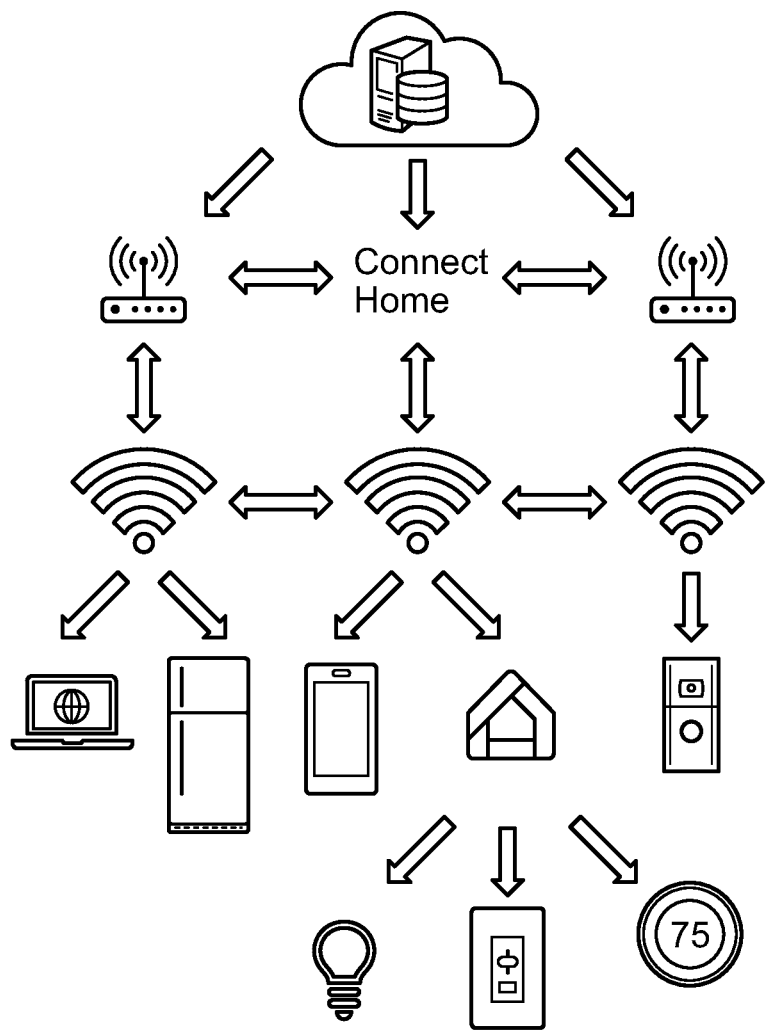
FIG. 21 depicts a simplified representation of a smart home system according to an embodiment of the present invention.

To demonstrate the functionality of GRAVITAS, a sample smart home system was simulated involving common household devices. FIG. 21 shows a simplified version of the system used for this analysis. While real-world devices in this system would contain built-in defenses out-of-the-box, this system assumes that the devices initially contain no defenses so that GRAVITAS can add them. Here, the defense set M includes the IoT-specific defenses outlined in ENISA's Baseline Security Recommendations for IoT. Defenses include but are not limited to: employ a hardware-based immutable root of trust; control the installation of software on operational systems; establish hard-to-crack device individual passwords; salt, hash, and/or encrypt authentication credentials.

Figure 22:
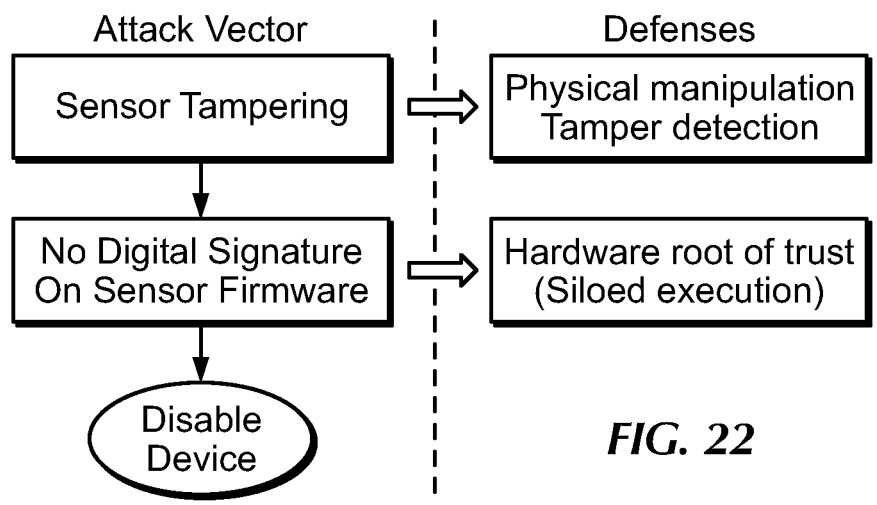
FIG. 22 depicts an exploit that employs vulnerabilities in a single device according to an embodiment of the present invention.
Figure 23:
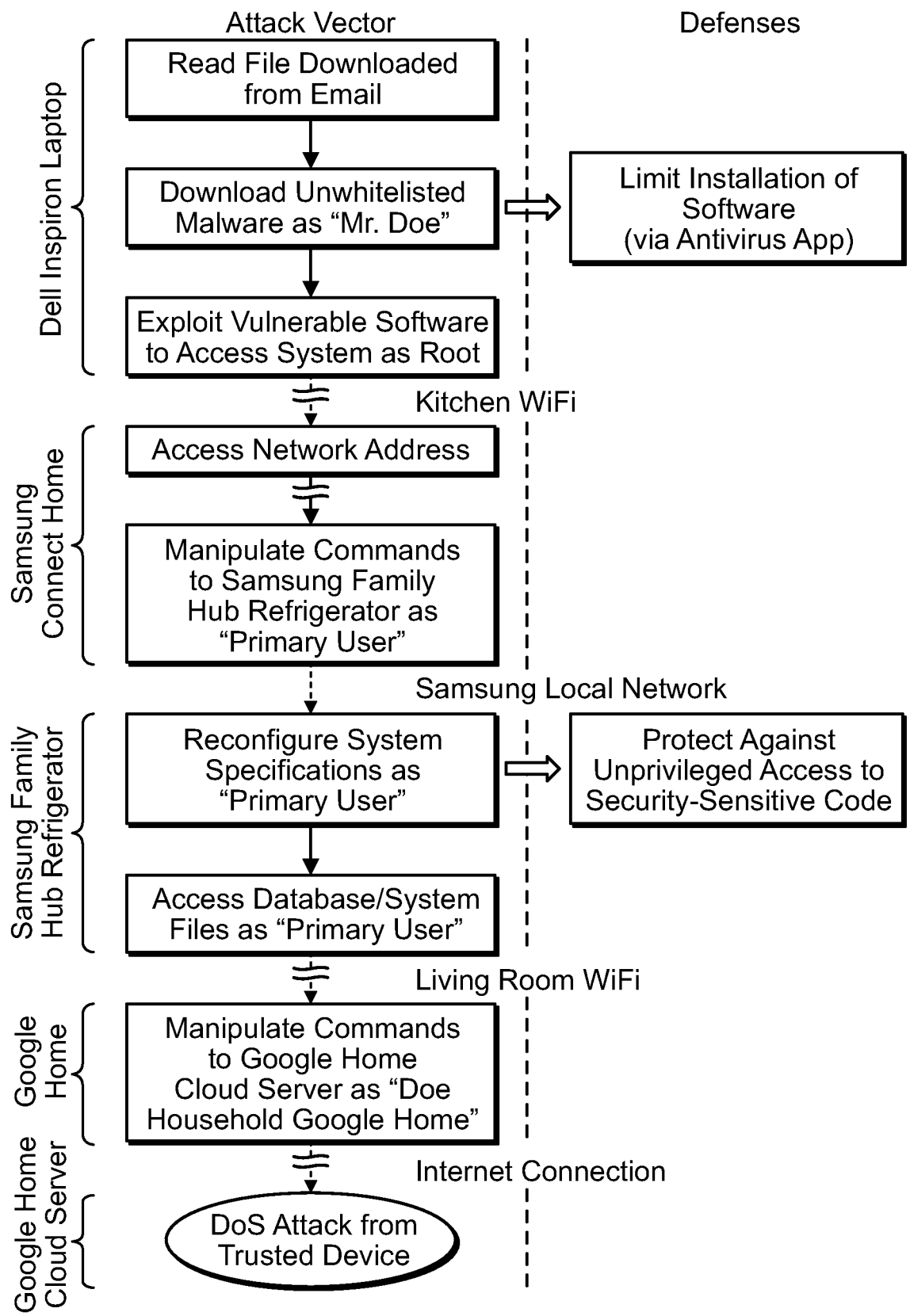
FIG. 23 depicts an exploit that employs vulnerabilities in multiple devices according to an embodiment of the present invention.
Figure 25A:
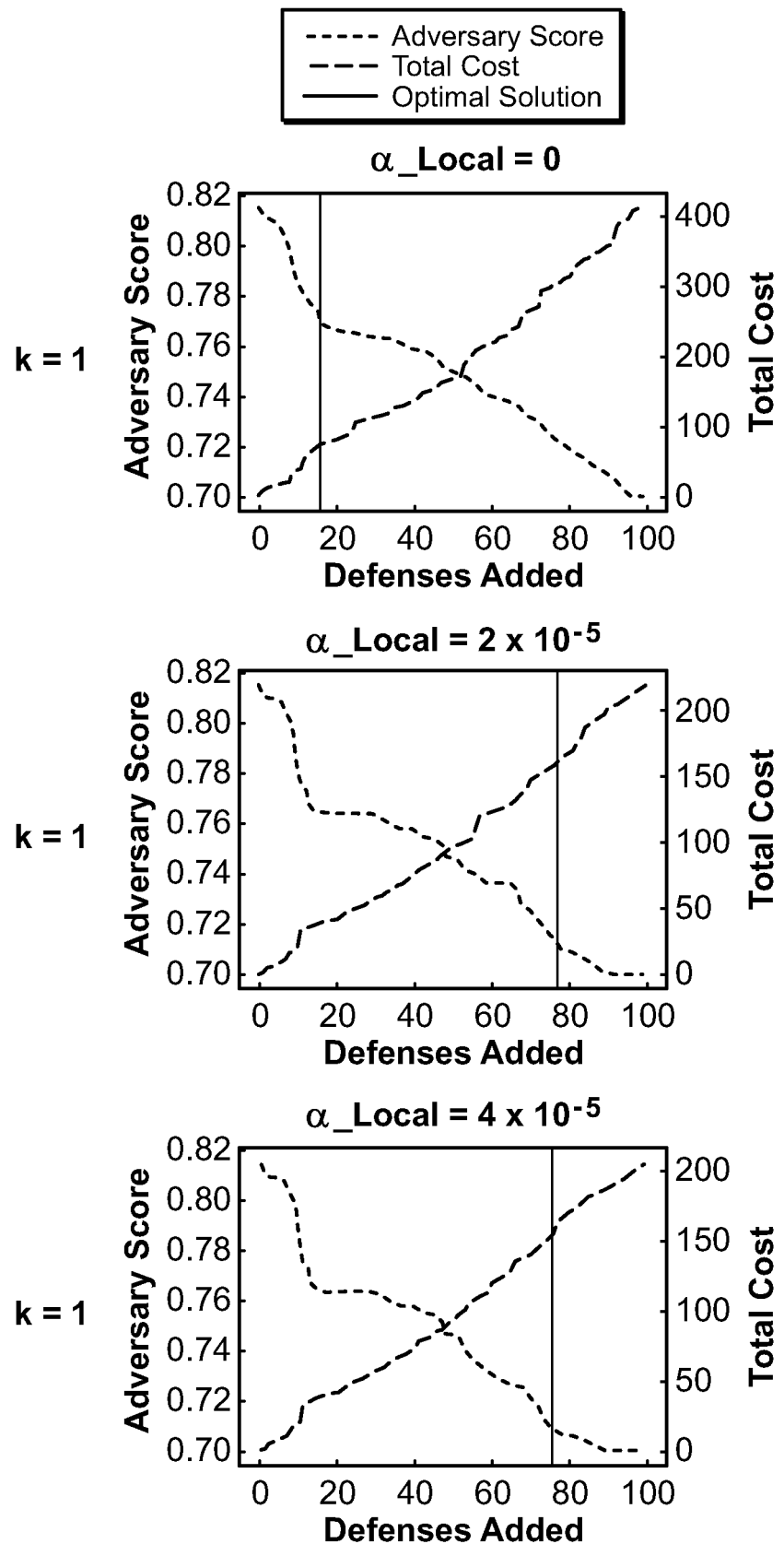
FIGS. 25(a)-(d) depict graphs of optimization curves and global optimal solutions during optimization of the smart home system according to an embodiment of the present invention.
Figure 25B:
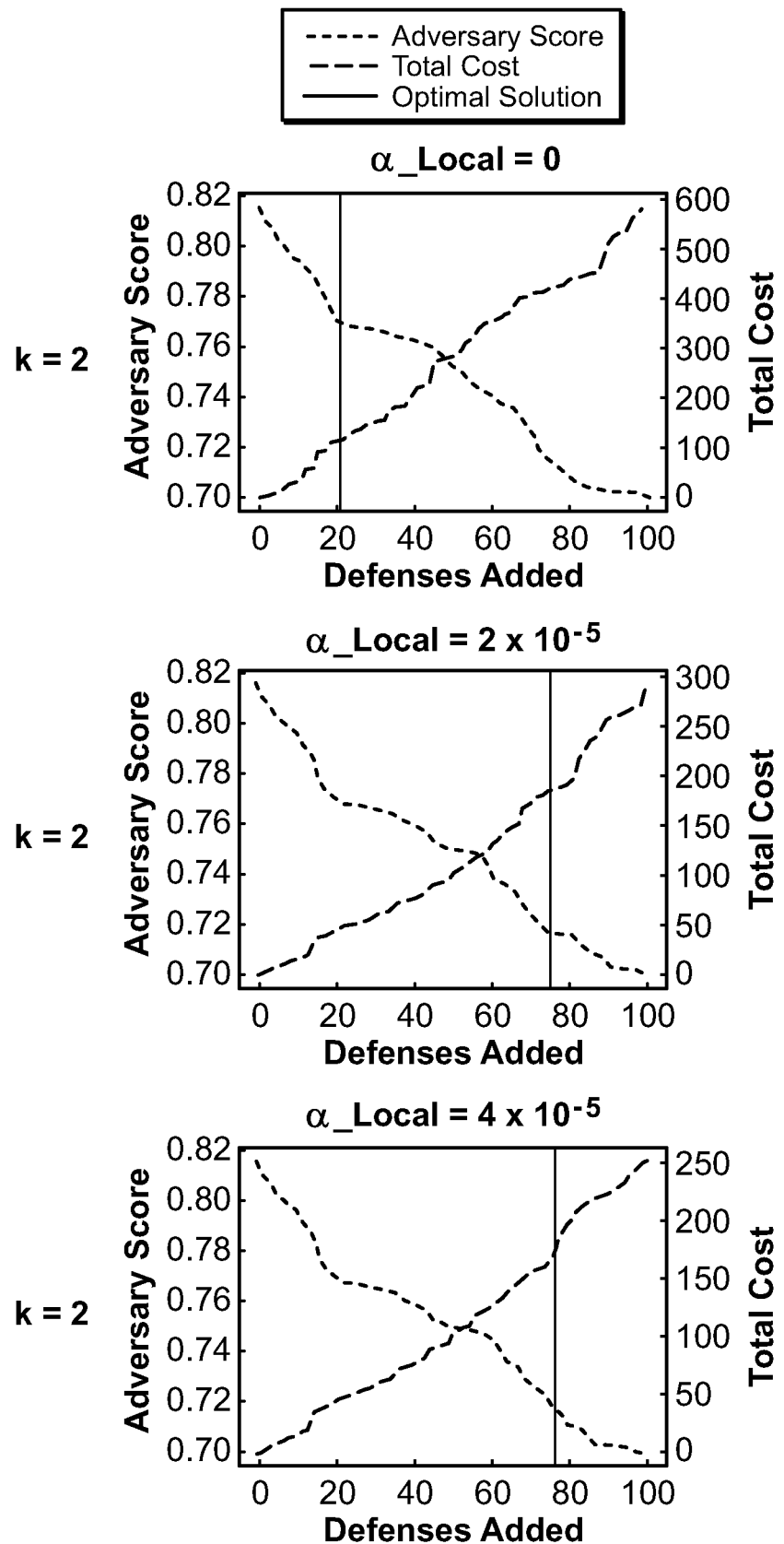
Figure 25C:
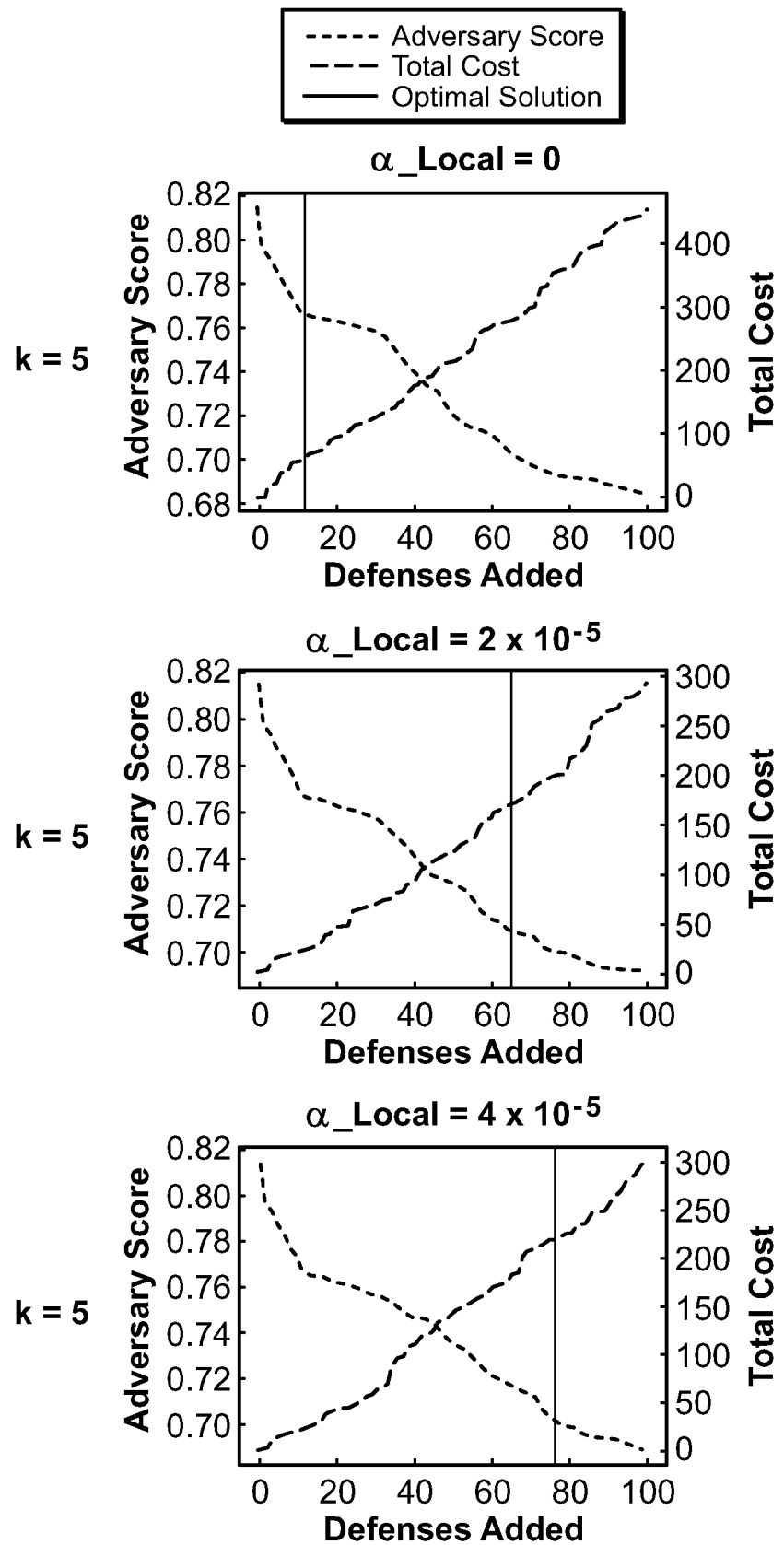
Figure 25D:
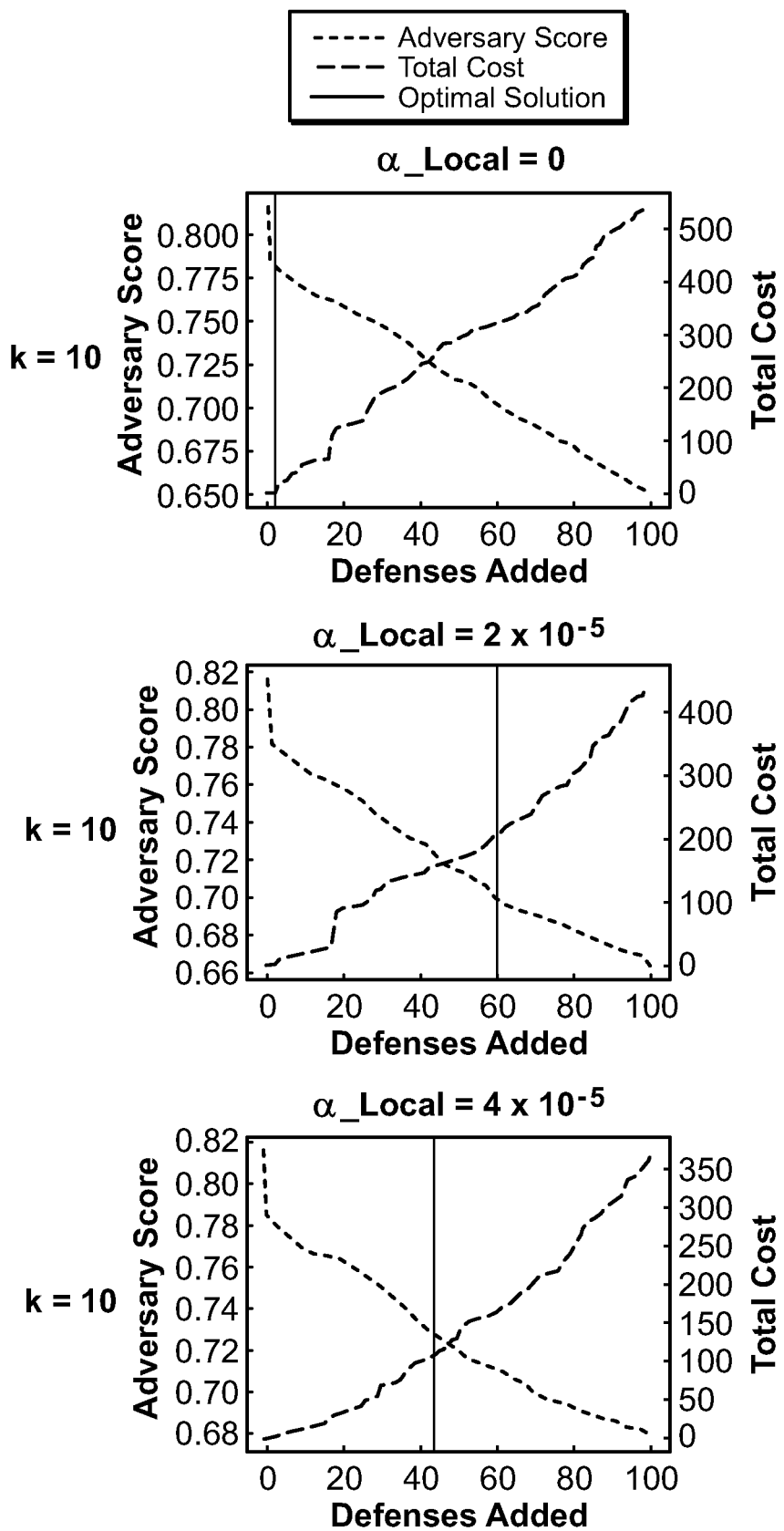

Part of GRAVITAS's novelty lies in its ability to discover attack vectors (exploit chains) passed over by traditional risk management software. Not only is it effective in discovering attack vectors in a single device, as shown in FIG. 22, but it can also discover multistage attack vectors that include exploiting vulnerabilities in multiple different devices, as shown in FIG. 23. These attacks might involve an adversary accessing trusted edge-side devices to gain access to private information in a cloud server or using illicitly obtained access to a central controller or user device to disable mission-critical sensing equipment. Both attacks demonstrate GRAVITAS's ability to include IoT/CPS-specific vulnerabilities in the attack graph, such as physical tampering for edge-side devices. There are numerous paths through the system available to the adversary, and GRAVITAS can find those attack vectors that are most likely to be targeted.

In FIG. 23, it is observed that the end result of the exploit is a DoS attack on the cloud server for the Google Home device. Its origin is a malware downloaded onto a laptop, which in turn instructs the Samsung fridge to flood the Google Home server with bogus traffic, thus launching a DoS attack. All this communication occurs via intermediaries such as a Samsung Connect controller and a WiFi router. Although the exploit looks complex, the adversary only needs to know that the laptop user has the Samsung Connect software installed. As a result of the length of this exploit chain, only a select few defenses are necessary to dramatically lower the exploit risk.

The system administrator can view these exploits independently or use GRAVITAS to determine the vulnerabilities that constitute the "weakest link" and disproportionately contribute to the adversary score. The table in FIG. 24 shows the three vulnerabilities with the highest exploit risk before defenses are added. Most traditional vulnerability scan-based risk management systems would not mark these vulnerabilities as particularly noteworthy since each cannot significantly compromise the security of its resident device by itself. However, GRAVITAS recognizes the importance of these vulnerabilities due to their crucial role in several attack vectors that lead to attack outcomes with high impact scores. It is worthwhile to also note that these exploit risk scores may be located in vulnerability nodes that are not entry nodes (n E A); as a result, the entry node exploit risk scores may be lower due to score dilution during the score propagation process.

This smart home system illustrates how apparently non-fatal vulnerabilities of stand-alone IoT devices can be combined to execute a fatal attack on a multi-device system. One example of this is the "Reconfigure system specifications as primary user" vulnerability of the Samsung Family Hub Refrigerator in FIG. 23. Gaining administrator-level access to an isolated smart fridge would not be a particularly harmful attack. However, because of the fridge's connection to Google Home and its subsequent connection to the Google Home Cloud Server, that one vulnerability can be used to execute a potent DoS attack via the smart home network hub; this could result in Google blacklisting the hub's IP address, thus disabling the entire IoT system. This type of attack may not be significant for a small home-based IoT system, but for a Smart Factory, it may have significant economic and safety consequences.

FIGS. 25($a$)-($d$) show the result of the optimization process using different values of a Local (the local objective function weighting parameter) and k (the number of entry node exploit risk scores averaged to obtain the adversary score). These graphs in FIGS. 25($a$)-($d$) show that the adversary score curve generally becomes less "noisy" as k increases. This is expected given that more scores are averaged for higher k. As a Local increases, cost is weighted higher in the objective function, and thus the adversary score drops less quickly while the cost also increases less quickly. Changing k or the adversary score has a nonlinear impact on the optimal value (represented by the black line for a Global=0.00032.

Analysis

To enhance the current framework, it may be necessary to occasionally prune the graph and incorporate software-specific vulnerabilities from repositories like the NVD. Tools such as CVE-Search can be used to extract an up-to-date list of vulnerabilities for every device, while off-the-shelf software can be employed to match these vulnerabilities with those in template attack graphs. Yet even without these additions, GRAVITAS still provides added value in that it considers the whole array of vulnerabilities likely to be present in a device, rather than only those that have already been discovered. This approach allows proactive management of the system, allowing the system administrator to fortify the devices and network connections that would have the highest risk of exploitation if the vulnerability existed.

The categories and subcategories try to encompass the wide range of IoT/CPS devices that exist today, but they cannot realistically be expected to cover all devices. For example, the authentication procedures of embedded devices vary widely, not least because of the dozens of different security protocols and miniature operating systems that these devices use. In addition, the limited graph templates of GRAVITAS may lead the system administrator to "pigeon-hole" their device into an ill-fitting category, accidentally including vulnerabilities that may not exist and excluding those that do exist. Fortunately, GRAVITAS was built to be adaptable: system administrators can easily add additional device templates and known vulnerabilities to the system graphs. As a result, GRAVITAS is adaptable to applications in 5G systems, the design of medical body-area networks, smart city systems, manufacturing facilities, and public utility networks.

The optimization component of GRAVITAS could also be improved. Its "greedy local search" methodology does not consider how adding a defense in the current round will affect the objective function value in later rounds. One possibility is to add "lookahead" functionality that simply adds multiple defenses instead of one to each new entrant in the defense set. A more complex approach would see the local objective function augmented with information about past iterations of the attack graph, perhaps employing a nonlinear estimator for future defense additions.

Despite the cyclic nature of the attack graphs, there were never any convergence issues during the millions of exploit risk score propagation cycles we run during parameter validation and the smart home tests. Virtually every propagation iteration completed in 50 cycles or less, and none exceeded 100 cycles of propagation. However, there were some issues regarding the consistency of vulnerability scores among different propagation cycles: the exact same graphs with the exact same defenses applied in a different order would sometimes have a slightly different maximum vulnerability score. This is likely due to rounding errors that compound after several thousand floating point calculations during score propagation. While these errors were immaterial in the Smart Home system and the TASC systems, they do point to the possibility of a "Butterfly Effect" phenomenon in larger systems, where a different random seed or slightly modified system can have a larger impact on the outcome. To guard against this, the system administrator should perform the entire optimization process multiple times with different seeds so that there are several defense histories from which to pick the optimal solution.

Another issue with GRAVITAS lies in its treatment of defenses. Adding new hardware defenses is difficult post-production, and although it is theoretically possible to add software updates to an existing device, this is not always feasible. For an extant IoT/CPS, rearranging the connections between devices is often far more feasible than changing the devices themselves. Future versions of GRAVITAS should not just be able to add node and edge defenses, but also rearrange the system topology, including permissions and local network connections.

Conclusion:

Embodiments for GRAVITAS provide new insights into the security of complex IoT/CPS, suggesting new exploits by incorporating potential vulnerabilities into the attack graph and applying strategically placed defenses that reduce the system's exploit risk. It is also adaptable to the risk model of the system administrator and can be used to determine which assets are most likely to be impacted in the event of a system breach. GRAVITAS optimizes the defense placements to obtain the best trade-off between system security and cost of operation. Most importantly, GRAVITAS allows for an organization to test and repair the configuration of an IoT/CPS before deployment, providing a proactive security solution that takes a holistic view of the system. In an era where IoT/CPS will soon be ubiquitous, getting the security right the first time is essential. As a risk assessment tool specifically tailored to the unique devices and complex topology of IoT/CPS, GRAVITAS could become an important tool in the arsenal of security practitioners.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A system for detecting security vulnerabilities in at least one of cyber-physical systems (CPSs) and Internet of Things (IoT) devices, the system comprising one or more processors configured to:
   construct an attack directed acyclic graph (DAG) unique to each CPS or IoT device of the devices, each attack DAG comprising a first plurality of nodes, each node of the first plurality representing a system-level operation of the device, a plurality of paths, each path representing an attack vector of the device, and a second plurality of nodes, each node of the second plurality representing an exploit goal of the device;
   generate an aggregate attack DAG from a classification of each device and a location of each device in network topology specified by a system administrator, where classification comprises at least one of a purpose and physical limitation of the device;
   calculate a vulnerability score and exploit risk score for each node in the aggregate attack DAG; and
   optimize placement of defenses to reduce an adversary score of the aggregate attack DAG.

2. The system of claim 1, wherein the first plurality of nodes further comprises root nodes and the second plurality of nodes further comprises leaf nodes.

3. The system of claim 1, wherein a location of each device in network topology comprises whether each device has a wired or wireless connection to other devices in a local network.

4. The system of claim 1, wherein a location of each device in network topology comprises whether each device can connect to an external network.

5. The system of claim 1, wherein the processors are further configured to generate a set of potential defenses to be applied during optimization.

6. The system of claim 1, wherein the processors are further configured to generate an aggregate attack DAG from permissions for each device specified by the system administrator.

7. The system of claim 6, wherein the permissions comprise at least one of login permissions and execute command permissions.

8. The system of claim 1, wherein the processors are further configured to calculate each vulnerability score based on exploitability factors of the device and adjust the vulnerability score based on any defenses applied.

9. The system of claim 1, wherein each vulnerability score is calculated once.

10. The system of claim 1, wherein the processors are further configured to calculate each exploit risk score with a probabilistic union function based on corresponding vulnerability scores.

11. The system of claim 1, wherein each exploit risk score is recalculated when a new defense is added.

12. The system of claim 1, wherein the processors are further configured to optimize placement of defenses to minimize objection functions specified by the system administrator.

13. The system of claim 1, wherein the adversary score is based on an adversary model specified by the system administrator and a function of the exploit risk scores for each node in the aggregate attack DAG.

14. A method for detecting security vulnerabilities in at least one of cyber-physical systems (CPSs) and Internet of Things (IoT) devices, the method comprising:
constructing an attack directed acyclic graph (DAG) unique to each CPS or IoT device of the devices, each attack DAG comprising a first plurality of nodes, each node of the first plurality representing a system-level operation of the device, a plurality of paths, each path representing an attack vector of the device, and a second plurality of nodes, each node of the second plurality representing an exploit goal of the device;
generating an aggregate attack DAG from a classification of each device and a location of each device in network topology specified by a system administrator, where classification comprises at least one of a purpose and physical limitation of the device;
calculating a vulnerability score and exploit risk score for each node in the aggregate attack DAG; and
optimizing placement of defenses to reduce an adversary score of the aggregate attack DAG.

15. The method of claim 14, wherein the first plurality of nodes further comprises root nodes and the second plurality of nodes further comprises leaf nodes.

16. The method of claim 14, wherein a location of each device in network topology comprises whether each device has a wired or wireless connection to other devices in a local network.

17. The method of claim 14, wherein a location of each device in network topology comprises whether each device can connect to an external network.

18. The method of claim 14, further comprising generating a set of potential defenses to be applied during optimization.

19. The method of claim 14, further comprising generating an aggregate attack DAG from permissions for each device specified by the system administrator.

20. The method of claim 19, wherein the permissions comprise at least one of login permissions and execute command permissions.

21. The method of claim 14, further comprising calculating each vulnerability score based on exploitability factors of the device and adjusting the vulnerability score based on any defenses applied.

22. The method of claim 14, wherein each vulnerability score is calculated once.

23. The method of claim 14, further comprising calculating each exploit risk score with a probabilistic union function based on corresponding vulnerability scores.

24. The method of claim 14, wherein each exploit risk score is recalculated when a new defense is added.

25. The method of claim 14, further comprising optimizing placement of defenses to minimize objection functions specified by the system administrator.

26. The method of claim 14, wherein the adversary score is based on an adversary model specified by the system administrator and a function of the exploit risk scores for each node in the aggregate attack DAG.

27. A non-transitory computer-readable medium having stored thereon a computer program for execution by a processor configured to perform a method for detecting security vulnerabilities in at least one of cyber-physical systems (CPSs) and Internet of Things (IoT) devices, the method comprising:
constructing an attack directed acyclic graph (DAG) unique to each CPS or IoT device of the devices, each attack DAG comprising a first plurality of nodes, each node of the first plurality representing a system-level operation of the device, a plurality of paths, each path representing an attack vector of the device, and a second plurality of nodes, each node of the second plurality representing an exploit goal of the device;
generating an aggregate attack DAG from a classification of each device and a location of each device in network topology specified by a system administrator, where classification comprises at least one of a purpose and physical limitation of the device;
calculating a vulnerability score and exploit risk score for each node in the aggregate attack DAG; and
optimizing placement of defenses to reduce an adversary score of the aggregate attack DAG.

28. The non-transitory computer-readable medium of claim 27, wherein the first plurality of nodes further comprises root nodes and the second plurality of nodes further comprises leaf nodes.

29. The non-transitory computer-readable medium of claim 27, wherein a location of each device in network topology comprises whether each device has a wired or wireless connection to other devices in a local network.

30. The non-transitory computer-readable medium of claim 27, wherein a location of each device in network topology comprises whether each device can connect to an external network.

31. The non-transitory computer-readable medium of claim 27, wherein the method further comprises generating a set of potential defenses to be applied during optimization.

32. The non-transitory computer-readable medium of claim 27, wherein the method further comprises generating an aggregate attack DAG from permissions for each device specified by the system administrator.

33. The non-transitory computer-readable medium of claim 32, wherein the permissions comprise at least one of login permissions and execute command permissions.

34. The non-transitory computer-readable medium of claim 27, wherein the method further comprises calculating each vulnerability score based on exploitability factors of the device and adjusting the vulnerability score based on any defenses applied.

35. The non-transitory computer-readable medium of claim 27, wherein each vulnerability score is calculated once.

36. The non-transitory computer-readable medium of claim 27, wherein the method further comprises calculating each exploit risk score with a probabilistic union function based on corresponding vulnerability scores.

37. The non-transitory computer-readable medium of claim 27, wherein each exploit risk score is recalculated when a new defense is added.

38. The non-transitory computer-readable medium of claim 27, wherein the method further comprises optimizing placement of defenses to minimize objection functions specified by the system administrator.

39. The non-transitory computer-readable medium of claim 29, wherein the adversary score is based on an adversary model specified by the system administrator and a function of the exploit risk scores for each node in the aggregate attack DAG.

* * * * *